United States Patent
Schmitz et al.

(10) Patent No.: US 12,035,387 B2
(45) Date of Patent: Jul. 9, 2024

(54) METHODS AND APPARATUS FOR ROUTINE BASED FOG NETWORKING

(71) Applicant: Micron Technology, Inc., Boise, ID (US)

(72) Inventors: Tamara Schmitz, Scotts Valley, CA (US); Mark Wang, San Diego, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/322,709

(22) Filed: May 17, 2021

(65) Prior Publication Data

US 2021/0274581 A1 Sep. 2, 2021

Related U.S. Application Data

(63) Continuation of application No. 16/242,960, filed on Jan. 8, 2019, now Pat. No. 11,013,043.

(51) Int. Cl.
| | |
|---|---|
| *H04W 76/14* | (2018.01) |
| *H04L 12/42* | (2006.01) |
| *H04L 41/147* | (2022.01) |
| *H04L 47/80* | (2022.01) |
| *H04L 61/5038* | (2022.01) |
| *H04L 67/50* | (2022.01) |

(52) U.S. Cl.
CPC ............ *H04W 76/14* (2018.02); *H04L 12/42* (2013.01); *H04L 41/147* (2013.01); *H04L 47/808* (2013.01); *H04L 61/5038* (2022.05); *H04L 67/535* (2022.05)

(58) Field of Classification Search
None
See application file for complete search history.

(56) References Cited

U.S. PATENT DOCUMENTS

| | | | |
|---|---|---|---|
| 8,588,803 B2 | 11/2013 | Hakola et al. | |
| 10,754,661 B1 * | 8/2020 | Righi | H04L 63/0236 |
| 11,013,043 B2 * | 5/2021 | Schmitz | H04L 61/5038 |

(Continued)

FOREIGN PATENT DOCUMENTS

| | | |
|---|---|---|
| CN | 103916385 | 7/2014 |
| CN | 107222843 | 9/2017 |

OTHER PUBLICATIONS

Extended European Search Report, EP20738526.1, dated Jul. 27, 2022.

(Continued)

*Primary Examiner* — Lonnie V Sweet
(74) *Attorney, Agent, or Firm* — Greenberg Traurig

(57) ABSTRACT

Methods and apparatus for organizing a distributed network based on routine usage data. In one exemplary embodiment, devices analyze routine usage data via e.g., machine learning and/or other heuristics to determine a set of routine rules and/or routine trigger conditions. Multiple devices may be assigned routine rules and/or routine trigger conditions that establish a fog network. Various described embodiments may incorporate time-shifted control plane operation and/or ledger-based control plane operation; these variants do not require central network management. Other optimizations may include dynamic selection of network topologies and/or routing technologies.

20 Claims, 21 Drawing Sheets

(56) References Cited

U.S. PATENT DOCUMENTS

| | | |
|---|---|---|
| 2009/0257353 A1 | 10/2009 | Song et al. |
| 2011/0002314 A1 | 1/2011 | Choi et al. |
| 2011/0312331 A1 | 12/2011 | Hakola et al. |
| 2012/0039175 A1 | 2/2012 | Sridhar et al. |
| 2012/0158954 A1 | 6/2012 | Heffernan et al. |
| 2012/0179527 A1* | 7/2012 | Ball .................. G06Q 30/0215 705/14.1 |
| 2013/0337822 A1 | 12/2013 | Rubin et al. |
| 2014/0126410 A1* | 5/2014 | Agarwal ............ H04W 64/006 370/332 |
| 2015/0055504 A1* | 2/2015 | Bellamkonda ........ H04W 16/26 370/254 |
| 2015/0092553 A1 | 4/2015 | Sirotkin et al. |
| 2015/0199616 A1 | 7/2015 | Rajendraprasad |
| 2015/0249586 A1* | 9/2015 | Byers ................ H04L 43/0805 709/224 |
| 2015/0249588 A1 | 9/2015 | Leon et al. |
| 2015/0257012 A1 | 9/2015 | Zhang |
| 2016/0086191 A1* | 3/2016 | Fonzi ................. G06Q 30/0281 705/304 |
| 2016/0091872 A1 | 3/2016 | Marti et al. |
| 2016/0255502 A1 | 9/2016 | Rajadurai et al. |
| 2017/0048308 A1 | 2/2017 | Qaisar |
| 2017/0325159 A1 | 11/2017 | Kneckt et al. |
| 2018/0173572 A1 | 6/2018 | Bequet et al. |
| 2018/0181446 A1 | 6/2018 | Bequet et al. |
| 2018/0242190 A1 | 8/2018 | Khoryaev et al. |
| 2019/0042496 A1* | 2/2019 | Peffers ................ G06F 13/1673 |
| 2019/0349190 A1 | 11/2019 | Smith et al. |
| 2019/0349433 A1 | 11/2019 | Smith et al. |
| 2022/0294690 A1 | 9/2022 | Nolan et al. |

OTHER PUBLICATIONS

Huawei, "RAN Support for Core Network Slicing." RAN WG3 Meeting #93, Aug. 22-26, 2016.

* cited by examiner

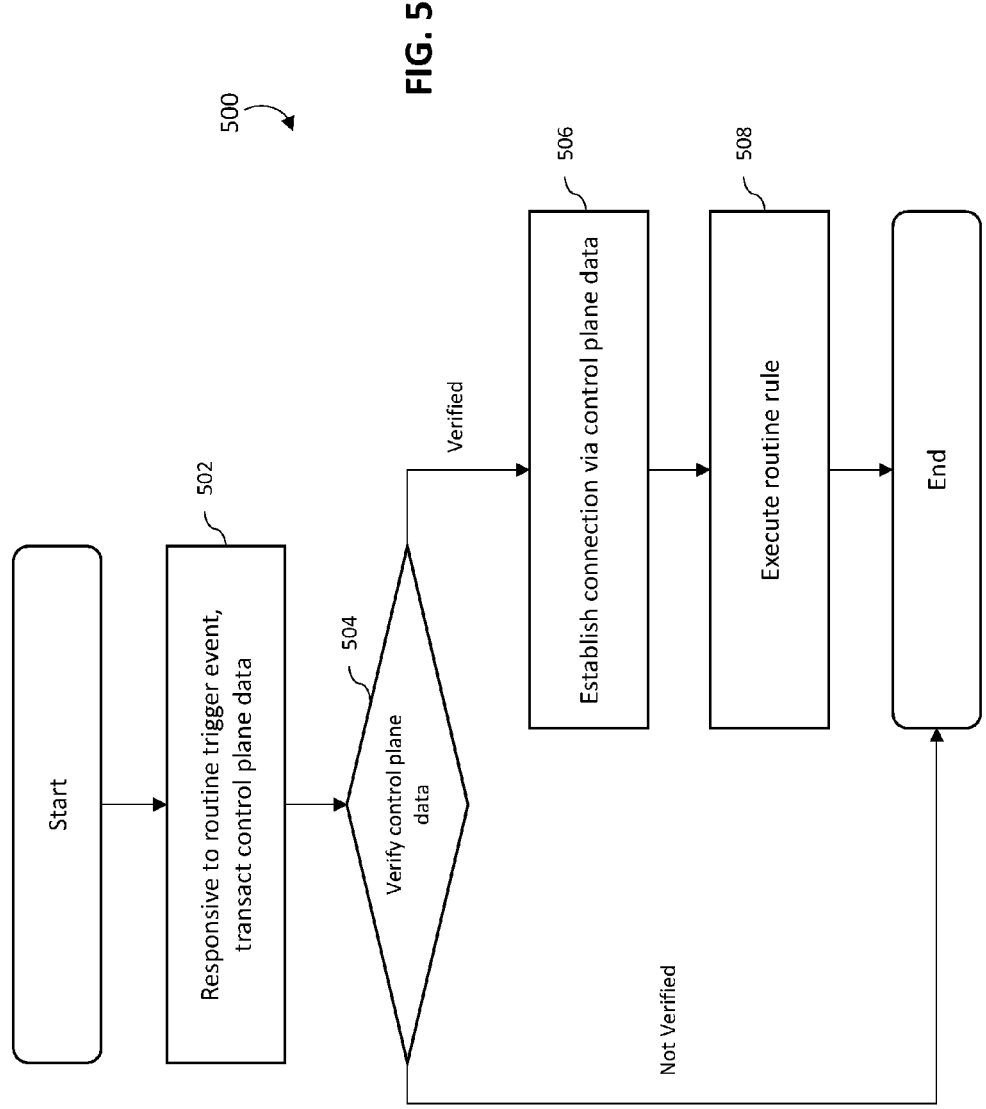

METHODS AND APPARATUS FOR ROUTINE BASED FOG NETWORKING

PRIORITY AND RELATED APPLICATIONS

This application is a continuation of and claims priority to co-owned and co-pending U.S. patent application Ser. No. 16/242,960 filed on Jan. 8, 2019 entitled "METHODS AND APPARATUS FOR ROUTINE BASED FOG NETWORKING," and issuing as U.S. Pat. No. 11,013,043 on May 18, 2021, which is incorporated herein by reference in its entirety.

Additionally, this application is related to co-owned and co-pending U.S. patent application Ser. No. 16/211,029, filed Dec. 5, 2018, and entitled "METHODS AND APPARATUS FOR INCENTIVIZING PARTICIPATION IN FOG NETWORKS", incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The following relates generally to the field of data networks and wireless devices, and specifically in one exemplary aspect to a network architecture in which user devices self-organize and/or participate in decentralized wireless networks without the benefits of centralized network management.

2. Description of Related Technology

Wireless radio networks have provided the underlying means of connection for radio-based communication networks to user devices and have become a necessary part of computing in commercial and everyday uses. For example, cellular networks provide ubiquitous connectivity throughout all of the United States, and most of the world. Historically, user devices were significantly constrained in computational power, memory, and/or power consumption, thus network management was performed centrally at e.g., a core network, or access point. However, the continued advance of technology has introduced powerful new components and techniques, some of which may be leveraged within user devices.

For example, modern user devices (e.g., smartphone, tablet, phablet, laptop, smartwatch, or other wireless-enabled devices, mobile or otherwise) generally support multiple radio interfaces that enable the user devices to connect to one another, or to networks (e.g., the Internet, intranets, or extranets). In particular, user devices can wirelessly access a variety of different wireless networks (e.g., cellular, wireless area networks (WAN), metropolitan area networks (MAN), personal area networks (PAN), etc.) via networked hardware generally referred to as a "base station" and/or "wireless access points" (AP). Typically, wireless networks can enable access to terrestrial networks via e.g., a backend or backhaul portion of service provider network (e.g., a cable network).

As demand for mobile communication to wireless networks have grown and evolved, so have infrastructures and standards for wireless networking. It is projected that mobile data traffic will grow by at least an order of magnitude over the next decade. To accommodate, transfer rates and latency must decrease, and data capacity must grow to keep up with the demand. Incipient standards for so-called 5G (fifth generation) wireless communications (e.g., Release 15 as further described below) aim to pave the way for significant improvements over existing 4G (fourth generation) wireless communications. More specifically, 5G aims to leverage, inter alia, ultra-high data rates, ultra-high reliability and ultra-low latency (e.g., faster data rates over 4G (multi-Gbps, e.g., 10 Gbps) and faster response times (pings as low as 1 ms), greater connection density for efficient signaling (e.g., via beamforming) and traffic capacity, more cost-effective data plans for consumers and subscribers of cellular service providers, and a much greater network efficiency that optimizes network energy consumption with more efficient processing of data.

One proposed technology for 5G networks is so-called "fog networking." Fog networking is a design paradigm that attempts to decentralize and distribute computing burden and data storage to minimize overall network burden. For example, data that is locally consumed may be stored locally near its consumer, whereas data that is widely distributed may be centrally stored. Fog computing extends cloud computing and services to the edge of the network, bringing the advantages and power of the cloud closer to where data is created and acted upon.

SUMMARY

The present disclosure provides, inter alia, methods and apparatus for organizing a distributed network based on routine usage data.

In one aspect, a method for identifying fog networking opportunities is disclosed. In one embodiment, the method includes: collecting user routine data; generating a routine rule and a routine trigger based on the user routine data; propagating the routine rule and the routine trigger to a first device and a second device; wherein responsive to an observable event that corresponds to the routine trigger: the first device and the second device establish a connection; and the first device and the second device execute the routine rule.

In one variant, generating the routine rule and the routine trigger based on the user routine data includes: identifying an observable event trigger having a correlation to a future event that exceeds a minimum predictive value; assigning the routine trigger to the first device and the second device based on the observable event trigger; and assigning the routine rule to the first device and the second device based on the future event. In one exemplary variant, the method also includes determining the minimum predictive value based on a difference in demand for at least one of a time resource or a frequency resource from at least one of the first or the second device.

In one variant, the routine rule and the routine trigger are associated with a termination clause; and the first device and the second device deactivate the routine rule and the routine trigger when the termination clause.

In one variant, collecting the user routine data includes: collecting a first set of user routine data at the first device; and receiving a second set of user routine data collected at the second device.

In one variant, collecting the user routine data is performed at salient points or conditional events identified by a user of the first device.

In one variant, collecting the user routine data includes collecting a first set of user corresponding to the second device, at the first device.

In one aspect, a method for creating a fog network is disclosed. In one embodiment, the method includes: responsive to an observable event that corresponds to a routine trigger, receiving control plane data at a first device from a second device; verifying the control plane data at the first device; when the control plane data is verified, establishing a connection between the first device and a second device based on the control plane data; and executing a routine rule at the first device via the connection.

In one variant, the control plane data is time-shifted control plane data. In one such variant, the time-shifted control plane data includes a challenge or a response; and the challenge or the response is received from a network entity via an out-of-band communication.

In one variant, the control plane data includes a credit or debit to a ledger-based data structure.

In one variant, the connection is based on medium access control (MAC) addresses. In one such variant, the connection enables a device-to-device (D2D) network including a plurality of nodes. In another such variant, the plurality of nodes of the D2D network are arranged in a ring network.

In one aspect, a user device is disclosed. In one embodiment, the user device includes: a processor apparatus; one or more wireless network interfaces coupled with the processor apparatus and configured to perform data communication in a fog network; and a non-transitory computer-readable apparatus including a storage medium having at least one computer program thereon. In one exemplary embodiment, the at least one computer program includes a plurality of instructions configured to, when executed by the processor apparatus, cause the user device to: identify a routine trigger and a routine rule based on user routine data; propagate at least one of the routine trigger and the routine rule to at least one other device; and in response to an observable event that corresponds to the routine trigger, cause execution of the routine rule at the at least one other device.

In one variant, the non-transitory computer-readable apparatus further includes a data structure to store nonce data associated with the at least one other device; and the nonce data associated with the at least one other device enables the data communication in the fog network.

In one variant, the non-transitory computer-readable apparatus further includes a data structure to store a distributed ledger of credits and/or debits.

In one variant, the one or more wireless network interfaces are further configured to use medium access control (MAC) addresses in the fog network.

In one variant, the one or more wireless network interfaces are further configured to use logical network addresses in the fog network.

In one variant, the one or more wireless network interfaces are further configured to use medium access control (MAC) addresses in the fog network and use logical network addresses in a local area network (LAN).

In another aspect of the disclosure, a computerized wireless access node apparatus configured for organizing a distributed network based on routine usage data is disclosed.

In one embodiment, the computerized wireless access node includes: a wireless interface configured to transmit and receive RF waveforms in the spectrum portion; digital processor apparatus in data communication with the wireless interface; and a storage device in data communication with the digital processor apparatus and including at least one computer program.

In an additional aspect of the disclosure, computer readable apparatus is described. In one embodiment, the apparatus includes a storage medium configured to store one or more computer programs. In one embodiment, the apparatus includes a program memory or HDD or SDD on a computerized controller device. In another embodiment, the apparatus includes a program memory, HDD or SSD on a computerized access node.

In another aspect, methods for organizing a distributed network based on routine usage data are disclosed. In various embodiments thereof, the organizing a distributed network can include either or both of (i) identifying fog networking opportunities and/or (ii) creating a fog network. In some embodiments thereof, the network user may organize the network based on time-shifted control plane data. In other embodiments, the network user may organize the network based on ledger-based control plane data.

In another aspect, systems for accounting for network resource usage via routine usage data is disclosed. In some embodiments, the accounting methods are used to track and/or predict data cached and used by one or more client devices in one or more different networks.

These and other aspects shall become apparent when considered in light of the disclosure provided herein.

BRIEF DESCRIPTION OF THE DRAWINGS

FIG. 5 is a logical flow diagram of an exemplary method for creating fog networks, in accordance with the various principles described herein.

Figure 1A:
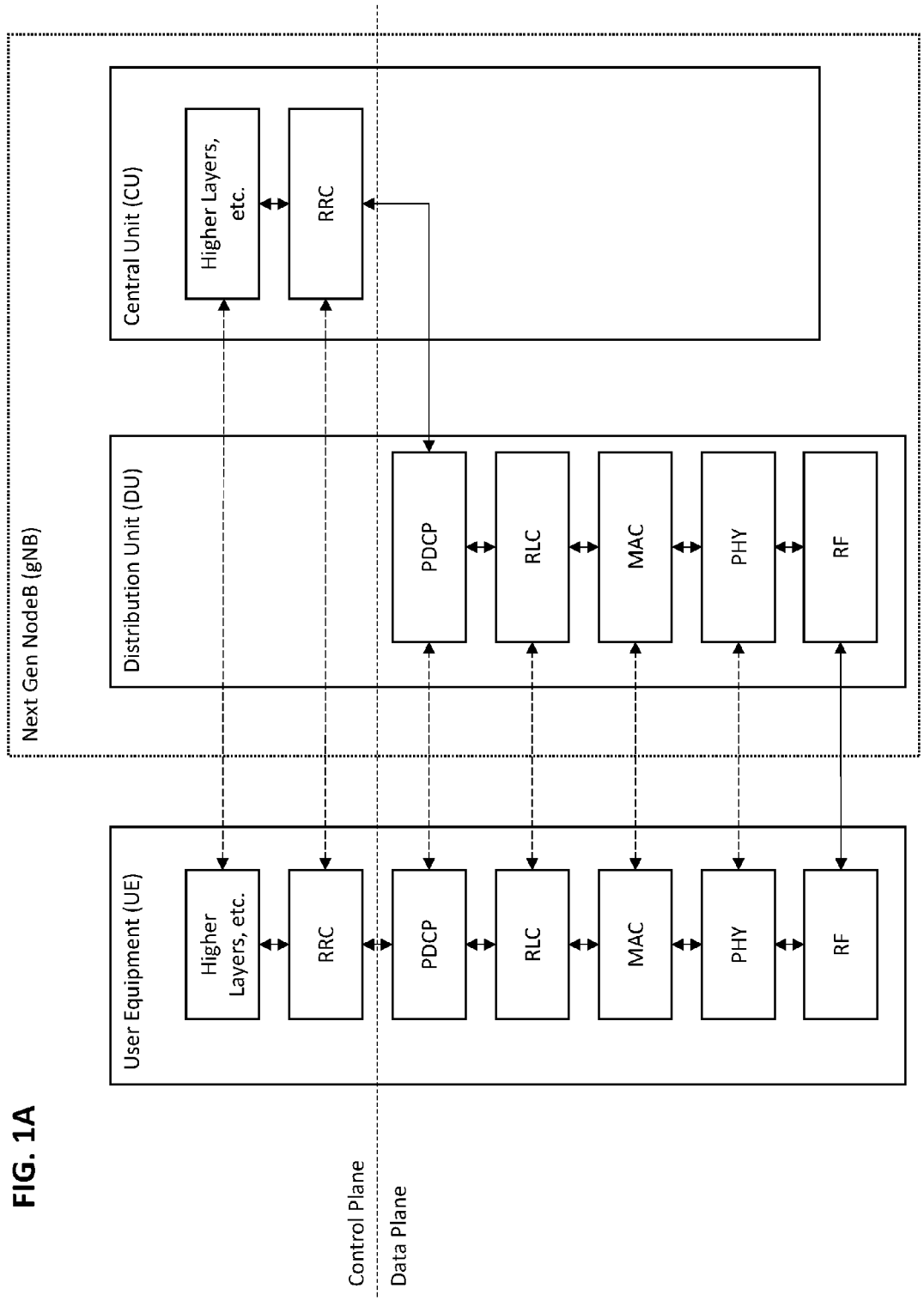
FIG. 1A is a logical block diagram of one exemplary Next Generation Radio Access Network (NG-RAN) communication stack protocol, useful to illustrate various aspects of the present disclosure.

All figures © Copyright 2018 Micron Technology, Inc. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a next-generation Node B (gNB) (also referred to next-generation evolved Node B (eNB)), an Long Term Evolution (LTE) eNB, a Wi-Fi Access Point (AP), etc.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable application that runs within an operating system environment.

As used herein, the term "central unit" (CU) refers without limitation to a centralized logical node within a wireless network infrastructure. For example, a CU might be embodied as a next-generation Node B (gNB) CU (gNB-CU) that controls the operation of one or more next-generation Node B (gNB) distribution units (gNB-DUs) defined below.

As used herein, the terms "client device" or "user device" or "UE" may include, but are not limited to, mobile devices such as handheld computers, PDAs, personal media devices (PMDs), tablets, "phablets", smartphones, and vehicle infotainment systems or portions thereof, as well as set-top boxes (e.g., DSTBs), gateways, modems, personal computers (PCs), and minicomputers, whether desktop, laptop, or otherwise.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Register Transfer Language (RTL), VHSIC (Very High Speed Integrated Circuit) Hardware Description Language (VHDL), Verilog, and the like.

As used herein, the term "decentralized" or "distributed" refers without limitation to a configuration or network architecture involving multiple computerized devices that are able to perform data communication with one another, rather than requiring a given device to communicate through a designated (e.g., central) network entity, such as a server device. For example, a decentralized network enables direct peer-to-peer data communication among multiple UEs (e.g., wireless user devices) making up the network.

As used herein, the term "distributed unit" (DU) refers without limitation to a distributed logical node within a wireless network infrastructure. For example, a DU might be embodied as a next-generation Node B (gNB) DU (gNB-DU) that is controlled by a gNB CU described above. One gNB-DU may support one or multiple cells; a given cell is supported by only one gNB-DU.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc. 5G-servicing core networks and network components (e.g., DU, CU, gNB, small cells or femto cells, 5G-capable external nodes) residing in the backhaul, fronthaul, crosshaul, or an "edge" thereof proximate to residences, businesses and other occupied areas may be included in "the Internet."

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, and other wireless data standards, including GSM, UMTS, CDMA2000, etc. (as applicable).

As used herein, the terms "5G NR, "5G," and "New Radio" refer without limitation to 3GPP Release 15 and TS 38.XXX Series and subsequent or related standards and releases (e.g., Release 16 and beyond), as further discussed throughout the present disclosure.

As used herein, the term "memory" includes any type of integrated circuit or other storage device adapted for storing digital data including, without limitation, random access memory (RAM), pseudostatic RAM (PSRAM), dynamic RAM (DRAM), synchronous dynamic RAM (SDRAM) including double data rate (DDR) class memory and graphics DDR (GDDR) and variants thereof, ferroelectric RAM (FeRAM), magnetic RAM (MRAM), resistive RAM (RRAM), read-only memory (ROM), programmable ROM (PROM), electrically erasable PROM (EEPROM or EPROM), DDR/2 SDRAM, EDO/FPMS, reduced-latency DRAM (RLDRAM), static RAM (SRAM), "flash" memory (e.g., NAND/NOR), phase change memory (PCM), 3-dimensional cross-point memory (3D Xpoint), and magnetoresistive RAM (MRAM), such as spin torque transfer RAM (STT RAM).

Memory devices may be volatile or non-volatile. Non-volatile memory (e.g., flash memory) can store data for extended periods of time even in the absence of an external power source. Volatile memory devices (e.g., DRAM) may lose their stored state over time unless they are periodically refreshed by an external power source. Certain features of volatile memory may offer performance advantages, such as faster read or write speeds, while features of non-volatile memory, such as the ability to store data without periodic refreshing, may be advantageous. Memory devices are widely used to store information in various electronic devices such as computers, wireless communication devices, cameras, digital displays, and the like.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" or "network service provider" refer to a cellular, satellite phone, WMAN (e.g., 802.16), or other network service provider having infrastructure required to deliver services including without limitation voice and data over those mediums. The term "MNO" as used herein is further intended to include mobile virtual network operators (MVNOs), mobile virtual network aggregators (MVNAs), and mobile virtual network enablers (MVNEs).

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives (e.g., hard disk drives (HDD), solid state drives (SDD)), Flash drives, DVR device, memory, RAID devices or arrays, optical media (e.g., CD-ROMs, Laserdiscs, Blu-Ray, etc.), or any other devices or media capable of storing content or other information, including semiconductor devices (e.g., those described herein as memory) capable of maintaining data in the absence of a power source. Common examples of memory devices that are used for storage include, without limitation: DRAM (e.g., SDRAM, DDR SDRAM, DDR2 SDRAM, DDR3 SDRAM, DDR4 SDRAM, GDDR, RLDRAM, LPDRAM, etc.), DRAM modules (e.g., RDIMM, VLP RDIMM, UDIMM, VLP UDIMM, SODIMM, SORDIMM, Mini-DIMM, VLP Mini-DIMM, LRDIMM, NVDIMM, etc.), managed NAND, NAND Flash (e.g., SLC NAND, MLC NAND, TLS NAND, Serial NAND, 3D NAND, etc.), NOR Flash (e.g., Parallel NOR, Serial NOR, etc.), multichip packages, hybrid memory cube, memory cards, solid state storage (SSS), and any number of other memory devices.

As used herein, the term "Wi-Fi" refers to, without limitation and as applicable, any of the variants of IEEE Std. 802.11 or related standards including 802.11 a/b/g/n/s/v/ac or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, analog cellular, CDPD, satellite systems, millimeter wave or microwave systems, acoustic, and infrared (i.e., IrDA).

As used herein, the term "work" refers to one or more tasks performed by a computerized device (e.g., a client device, a network entity, a storage device), and more specifically, various components thereof (e.g., a processor apparatus, a storage device, a modem, a chipset). By way of example, and without limitation, such tasks may include computational tasks, calculations, algorithmic determinations and evaluations of data, and execution of instructions by a processor apparatus. The tasks may include storage of data in temporary storage (in, e.g., DRAM, flash storage) or permanent storage (in, e.g., HDD, SDD), determination of length of storage, determination of locations (e.g., sectors) associated with data stored and data to be stored (e.g., from another device). The tasks may include measurement of bandwidth usage, including downlink and uplink data transfers between client devices, storage devices, management entities and controllers, etc. Various other types of tasks will become apparent given the present disclosure.

Overview

The aforementioned fog network paradigm is significantly more complex from a network management and organization standpoint than traditional network infrastructures. Traditional network planning in cellular networks was based on known base station locations. For instance, cellular networks provide connectivity to powerful compute resources and virtually unlimited memory storage via centralized management within the core network. In contrast, the fog network paradigm is based on a fluid and dynamically changing mesh of devices that may arbitrarily connect and/or disconnect at any time. These devices may span a wide gamut of enterprise servers, desktops, mobile devices, and/or even simple microcontrollers (e.g., Internet of Things (IoT)). As a result, an arbitrary consumer request could be serviced with a nearly infinite number of different resource and/or connectivity permutations within a fog network. Optimizing fog network operation is extremely difficult with existing network management techniques.

Consider a "commuting" scenario where a user is traveling to work and is surrounded by other commuters. Many of the commuters might be traveling to the same office or destination. There could potentially be many opportunities for fog networking synergies in such a context. For example, many of the commuters may wish to login to their corporate email systems and/or check the news to start their day. Propagating substantially similar content to the commuters via a fog network would be efficient for both the network and user devices.

Unfortunately, existing fog network techniques enable data delivery and processing directly at the edge, but rely on centralized network control and management for security and/or network management reasons. For example, the devices of the fog network must register with the core network (which requires centralized authentication, authorization, and accounting (AAA)). Additionally, devices of the fog network are assigned resources (e.g., frequency bands and timeslots) by the network. Existing fog networks ensure that device-to-device (D2D) communications are established between secure endpoint devices and that the devices themselves do not use network resources that would conflict with neighboring traffic. In other words, existing resource management fog networking is centralized, and does not distribute the network burden associated therewith.

While existing fog networks improve over traditional centralized network management for data flow, similar improvements are needed in fog network control and management. In particular, as user devices continue to expand in usages and complexity, centralized management will bottleneck fog networking effectiveness. Specifically, techniques for optimizing fog network connectivity by providing, for example, computational, storage, and/or network resources without centralized network control are needed. Such solutions should bolster network usage, improve network speeds (maximizing ultra-fast and ultra-responsive properties of 5G), and enable efficient processing of data by ensuring that resources are available where needed.

Various embodiments of the present disclosure organize a distributed network based on routine usage data. In one exemplary embodiment, devices store routine usage data and neighboring device data. The routine usage data and neighboring device data is analyzed via e.g., machine learning and/or other heuristics to determine a set of "routine rules" and/or "routine trigger" conditions. In some variants, multiple sets of routine usage data and/or device data are combined and considered together for overall network optimization.

Devices are assigned rules and/or triggering conditions which when triggered during subsequent routine usage, establish a "confluent" fog network without requiring central network management overhead at the time of "confluence". In other words, by collecting routine usage data and neighboring device data, the likely participants of a fog network can be predicted and prepared ahead of time. Specifically, the participants can exchange security information in advance, so as to enable fog connectivity when a confluence of triggering events occurs. Predetermined security measures (e.g., cryptographic signatures, etc.) can be used to enable secure device-to-device handshakes without centralized network management. Similarly, predetermined resource allocations can be assigned to ensure non-interfering network operation with neighboring devices.

As described in greater detail hereinafter, "time-shifting" network management and control ensures that network resources are not consumed to establish the fog network when access to network resources may be problematic for the fog network participants. Instead, network management and control (in the form of routine rules and/or routine triggers) can be propagated when e.g., connectivity, power, processor resources, and/or memory are not constrained. As a related benefit, many logistical issues can be handled in a non-time sensitive manner. For example, the network can account for devices that opt-in or opt-out of fog network participation ahead of time; this is preferable to the existing solutions of e.g., requesting user participation, commandeering devices without user consent, and/or repairing unexpected outages caused by participants exiting from the fog network e.g., when encountering undesirable performance loss.

Additionally, existing network communications stacks often include multiple layers of software abstraction and/or complexity. Many higher level networking functions are specifically designed to compensate for unpredictable and/or arbitrary network connectivity. For example, Transmission Control Protocol/Internet Protocol (TCP/IP) ensures packet delivery via a re-transmission protocol in packet switched networks (e.g., where the packet may need to be re-routed for delivery). Various embodiments of the present disclosure enable fog networks to be constructed for known topologies. In these circumstances, certain communication protocols may be more efficient; for example, ring networks can use medium access control (MAC) addressing that can be routed at much higher speeds than the aforementioned TCP/IP connections.

Furthermore, existing fog networks significantly limit data access, compute, and/or storage. For example, a device can only access data that is already present in the fog network (that another user had cached), or request a relay-like delivery of content through a chain of fog participants (many of which may not be interested in the content they are relaying). Similarly, edge based computing is constrained by unpredictable compute resource availability. Various embodiments of the present disclosure can predict when resources are available and/or when they are most likely to be used.

Another benefit of the time-shifting network management is that it may specifically prevent and/or penalize malicious behavior and/or reduce risk without compromising device privacy. More directly, time-shifting data structures can be used to organize one-time use fog networks in an out-of-band manner, among any arbitrary community of user devices. Time-shifting in combination with out-of-band coordination can greatly reduce (and/or entirely eliminate) malicious attacks that prey on repeated authentication or trust exchanges "in the wild". In other words, the one-time use nature of time-shifting technologies can provide more security than other techniques.

Various other techniques for incentivizing routine network participation are described hereinafter. For example, a user device may receive additional incentives for participating in fog networking according to a specified routine. Routine participation enables the network to coordinate participation in a predictable way. Participation may include contributions of e.g., processing power, data storage, and/or bandwidth to other user device or the network operator (e.g., transferring data from or to other client devices or even a "cloud" sever). These contributions are generally referred to as "credited" work for the fog network "backhaul". Similarly, when a user device consumes processing power, data storage, and/or bandwidth, the user may be "debited" work. The rates of crediting and/or debiting work for network participation may be dynamically adjusted. For example, during certain high use periods (e.g., peak hours), the credit and debit rates may be increased so as to incentivize the user device participation. Similarly, during low use periods (e.g., off-peak hours), the credit and debit rates may be decreased.

Unlike traditional networking techniques which often rely on centralized networks directing and/or commandeering user equipment for network bandwidth, the various aspects of the present disclosure enable users to opt-in, opt-out, and/or otherwise consent to network participation on the basis of a variety of considerations. In some embodiments, the network operator may choose to dynamically increase and/or decrease incentive schemes (e.g., offering cheaper bandwidth, prioritization, and/or cost incentives). In some embodiments, the user device may include a set of heuristics by which the participation may be increased or decreased. For example, a user may configure their user device to participate within a fog network when the credit rate offered by the network exceeds a minimum threshold. Similarly, a user may configure their user device to consume fog network resources when the debit rate offered by the network does not exceed a maximum threshold. More directly, allowing network operators and users to participate in a market of credits and debits for resource contributions should bolster network usage and improve network speeds (maximizing ultra-fast and ultra-responsive properties of 5G).

Detailed Description of Exemplary Embodiments

Exemplary embodiments of the apparatus and methods of the present disclosure are now described in detail. While these exemplary embodiments are described in the context of wireless access points (e.g., 5G-enabled central units (CUs) and distribution units (DUs), base stations, user client devices) associated with, e.g., a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access networks and architectures that are configured to deliver digital data (e.g., text, images, games, software applications, video and/or audio). Such other networks or architectures may be broadband, narrowband, or otherwise, the following therefore being merely exemplary in nature.

While the present disclosure is described generally with respect to usage in wireless mobile client devices connected to a network of other mobile devices, the present disclosure is not so limited, and may be implemented via wired networking, local intranet(s), and non-mobile devices (e.g., desktop PC, mainframe), including mobile-to-stationary devices (e.g., data communication between mobile device and 5G-enabled external radio access node).

Other features and advantages of the present disclosure will immediately be recognized by persons of ordinary skill in the art with reference to the attached drawings and detailed description of exemplary embodiments as given below.

5G ($5^{th}$ Generation) and NG-RAN (Next Generation Radio Access Network)—

Proposals for $5^{th}$ Generation (5G) radio technologies include Next Generation Radio Access Network (NG-RAN) technologies that are specified by the $3^{rd}$ Generation Partnership Project (3GPP). The 3GPP is currently completing the specifications of its Releases 15 NG-RAN which includes radio access network components and/or interactions among the involved nodes including so-called next generation Node Bs (gNBs). Releases 16, 17, and beyond will be finalized as 5G New Radio (5G NR) ecosystems are deployed commercially. Nonetheless, the 5G-implemented embodiments described herein may be implemented using Release 15 or higher.

NG-RAN will provide high-bandwidth, high-reliability, low-latency wireless communication and efficiently utilize, depending on application, both licensed and unlicensed spectra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure. Thus, compatibility with existing and new Long Term Evolution (LTE) entities may be supported to varying degrees. For example, an NG-RANs may need to support LTE evolved NodeBs (eNB s).

FIG. 1A is a logical block diagram of one exemplary NG-RAN communication stack protocol. As shown therein, the communication stack for the gNB communicates with the communication stack of a user equipment (UE) with at least the following layers: the Radio Resource Control (RRC) layer, the Packet Data Convergence Protocol (PDCP) layer, the Radio Link Control (RLC) layer, the Medium Access Control (MAC) layer, and the Physical Layer (PHY). Additionally, the illustrated gNB is functionally divided between a Central Unit (CU) and a Distribution Unit (DU).

As a brief aside, the traditional communication stack paradigm is composed of multiple modular software layers that are "stacked" together. Each layer of the communication stack separately manages its own implementation specific considerations, and provides an abstract communication interface to its upper and/or lower layers. For example, a higher layer (e.g., the Packet Data Convergence Protocol (PDCP) layer) may control a lower layer of the same device (e.g., the Radio Link Control (RLC) layer) using a limited set of control protocols. Additionally, each layer of the communication stack also communicates with a peer layer in other devices. For example, the RRC layer of one device coordinates and negotiates radio resources with the RRC layers of other devices. In this manner, different applications can communicate freely across different devices over an abstraction of the underlying network transport.

Software layers are loosely categorized into so-called "control plane" and "data plane" functionality. The so-called "control plane" layers refer to layers of the protocol stack that carry signaling traffic used for network routing. Control plane traffic originates from, or are destined for, a router or other network entity. In contrast, the so-called "data plane" layers carry signaling traffic used for individual network "hops" (i.e., a portion of the network path between source and destination). Data plane traffic is generated and consumed at each hop of the network. For example, according to the 3GPP Release 15, data plane functions may include data forwarding and flow control, whereas control plane functions may include interface management and error handling (e.g., setup, reset, removal, configuration update), connected mode mobility management (handover procedures, sequence number status transfer, UE context retrieval), and support of RAN paging, etc.

Referring back to FIG. 1A, the CU (also known as gNB-CU) is a logical node within the NR architecture that communicates with an NG Core, and includes gNB functions such as transfer of user data, session management, mobility control, RAN sharing, and positioning. Other functions are allocated exclusively to the DU (also known as gNB-DU(s)) per various "split" options described subsequently herein in greater detail. The CU communicates user data and controls the operation of the DU(s), via the data plane and control plane interfaces. The illustrated DU and CU split the gNB communication stack between the Radio Resource Control (RRC) layer and the Packet Data Convergence Protocol (PDCP) layer. Such a configuration is also referred to as an "Option 1" split. Under Option 1, the RRC (Radio Resource Control) is in the CU while PDCP (packet data convergence protocol), RLC (Radio Link Control), MAC (Medium Access Control), physical layer (PHY) and Radio Frequency (RF) are kept in the DU, thereby maintaining the entire data plane in the DU.

Other implementations of the NG-RAN architecture may use other splits. For example, under Option 2 the PDCP and RLC are split. Option 2 operation is additionally subdivided into two possible variants. In one such variant, the RRC and PDCP are maintained in the CU, while RLC, MAC, PHY and RF are in the DU. In a second variant, the RRC and PDCP are maintained in the CU with split data plane and control plane stacks, and RLC, MAC, physical layer and RF remain in the DU.

Under Option 3 (Intra RLC Split), two splits are possible: (i) a split based on ARQ (Automatic Retransmission Request); and (ii) a split based on Transmit (TX) RLC and Receive (RX) RLC. Both of these protocol layers are located within the RLC layer.

Under Option 4 (RLC-MAC split), the RRC, PDCP, and RLC are maintained in the CU, while the MAC, PHY, and RF are maintained in the DUs.

Under Option 5 (Intra-MAC split), the RF, physical layer and lower part of the MAC layer (Low-MAC) are in the DUs, while the higher part of the MAC layer (High-MAC), RLC and PDCP are in the CU.

Under Option 6 (MAC-PHY split), the MAC and upper layers are in the CU, while the PHY layer and RF are in the DUs. The interface between the CU and DUs carries data, configuration, and scheduling-related information (e.g. Modulation and Coding Scheme (MCS), layer mapping, beamforming and antenna configuration, radio and resource block allocation, etc.) as well as measurements.

Under Option 7 (Intra-PHY split), different sub-options for UL (uplink) and DL downlink) may occur independently. For example, in the UL, FFT (Fast Fourier Transform) and CP removal may reside in the DUs, while remaining functions reside in the CU. In the DL, IFFT and CP addition may reside in the DU, while the remainder of the PHY resides in the CU.

Finally, under Option 8 (PHY-RF split), the RF and the PHY layer may be separated to, inter alia, permit the centralization of processes at all protocol layer levels, resulting in a high degree of coordination of the RAN. This allows an optimized support of functions such as coordinated multi-point (CoMP), multiple input multiple output (MIMO), load balancing, and mobility.

The aforementioned split options are intended to enable flexible hardware implementations which allow scalable cost-effective solutions, as well as coordination for e.g., performance features, load management, and real-time performance optimization. Moreover configurable functional splits enable dynamic adaptation to various use cases and operational scenarios. Factors considered in determining how/when to implement such options can include: (i) QoS requirements for offered services (e.g. low latency, high throughput); (ii) support of requirements for user density and load demand per given geographical area (which may affect RAN coordination); (iii) availability of transport and backhaul networks with different performance levels; (iv) application type (e.g. real-time or non-real time); (v) feature requirements at the Radio Network level (e.g. Carrier Aggregation).

Figure 1B:
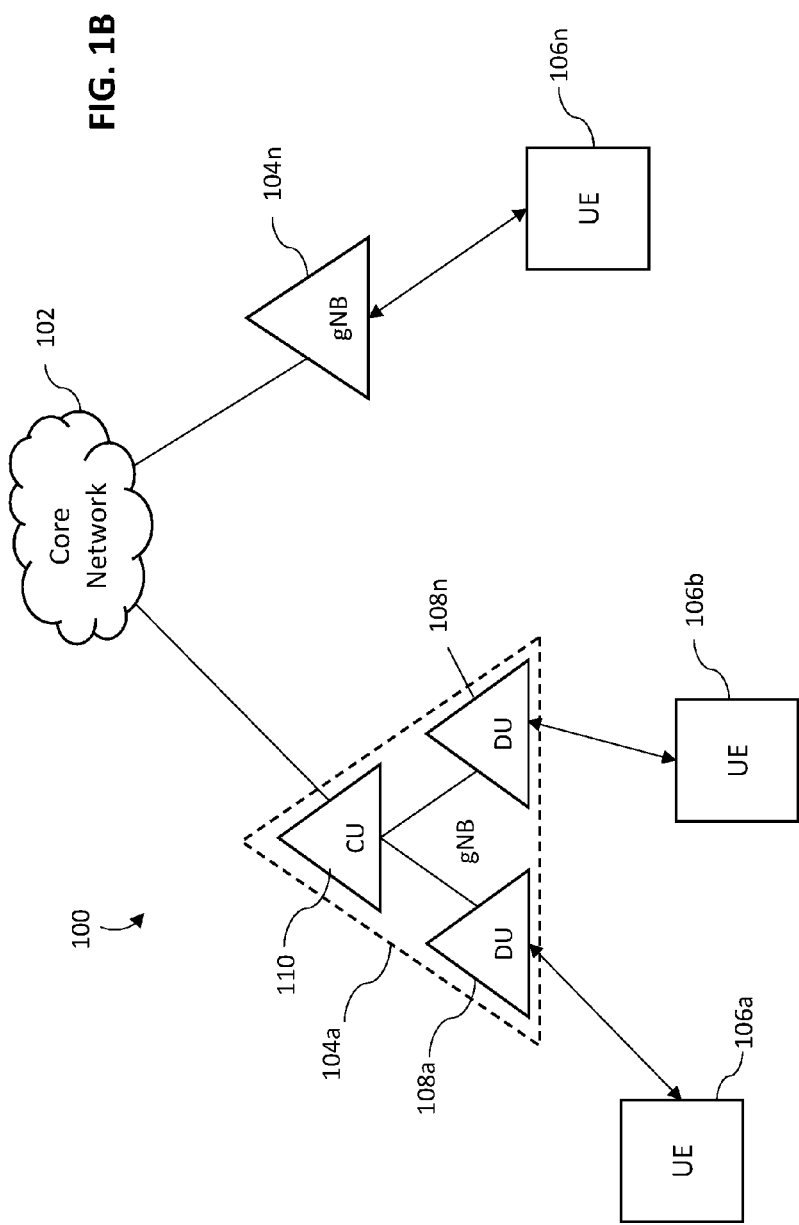
FIG. 1B is a logical block diagram of one exemplary Next Generation Radio Access Network (NG-RAN) architecture, useful to illustrate various aspects of the present disclosure.

FIG. 1B illustrates a typical network architecture 100 utilizing a core network 102, one or more next generation Node Bs (gNBs) 104*a*, 104*n*, and user equipment (UEs) 106*a*, 106*b*, 106*n*. UEs 106 may include mobile client devices, e.g., smartphones, tablets, laptops, phablets, smartwatches, personal digital assistants, smart home devices (e.g., able to read out statically programmed or dynamically formed words), and the like. As shown in FIG. 1B, a gNB (such as gNB 104*a*) may be further subdivided into distributed units (DUs) 108*a*, 108*b* that are managed by a central unit (CU) 110. Alternatively, a gNB may be a single network entity (such as gNB 104*n*).

As used herein, the term "backhaul" refers to the portion of the mobile network that connects geographically dispersed cell sites (e.g., gNBs 104) to the core network 102. In contrast, the term "fronthaul" refers to Radio Access Network (RAN) architectures that separate the cell sites into a centralized baseband controllers (e.g., a CU) and stand-alone remote radio heads (e.g., DU or RRH) installed at remote cell sites located kilometers to tens of kilometers away. For example, the gNB 104*a* may include a "fronthaul" RAN. It is also appreciated that the "backhaul" and the "fronthaul" in a 5G transport network may be fused together into a functionally split "crosshaul" that is dynamically reconfigurable and flexibly implemented based on various factors. For example, at one end of the scale, a 5G-enabled network may accommodate a backhaul and legacy access point or base station used in, e.g., a traditional "cloud" network. At the other end, a "fog" network (described in greater detail hereinafter) may be configured to exchange data through densely distributed wireless radio access nodes. These widely distributed access nodes may further leverage the enhanced communication protocol with the ubiquity of access nodes to achieve the aforementioned ultra-high data rate and ultra-low latency. A "crosshaul" may have properties of both a backhaul and a fronthaul, in which the infrastructure supports data exchange with a centralized server, e.g., disposed at a backend portion in the core network, as well as with various "edge" devices. For example, new data that is not contained within the fog may be delivered to a DU that "seeds" the new data to one or more edge devices.

The network architecture 100 may be used to provide Internet access and/or access to the core network 102 via gNBs 104 or other radio access nodes thereof (e.g., CU 106 and DUs 108). While the present disclosure is presented within the context of 3GPP wireless technologies, the various aspects of the present disclosure may be used with equivalent success in other technologies. For example, future networks may incorporate and/or blend e.g., personal area networks (e.g., Bluetooth), cellular networks, satellite networks, Wi-Fi networks and/or WiMAX networks.

Internet access generally entails the delivery of packet data (e.g., digital data carried within a packet or frame structure or protocol), however the architecture can also be used for a variety of other services including e.g., cellular coverage (e.g., voice services). In addition to Internet data and voice services, the network architecture 100 may also be used to provide content delivery via e.g., on-demand and broadcast content (e.g., live video programming), OTT (over-the-top) services, and other services of the type well known in the digital communication and broadcasting arts.

As can be seen in FIG. 1B, the network architecture 100 is typically a "tree-and-branch" structure, and hence multiple tiered wireless access nodes may be linked to each other or cascaded via higher order tree and branch topologies. For example, a gNB 104*n* may be in data communication with one or more child nodes upstream (connected to the core network 102 or other intermediate nodes) or downstream (connected to a UE 106n). Artisans of ordinary skill in the related arts will readily appreciate that tree topologies have some advantages; for example, they are highly flexible and enable centralized monitoring and point-to-point connection. Unfortunately, tree topologies can be difficult to dynamically configure and there may be cascading points of failure (e.g., a failed tree node will cause a blackout in service for all of its subsidiary branches.)

Tree topologies were well suited to the traditional centralized operation of cellular networks. For example, the core network 102 could control a user's network wide access via the aforementioned control plane. Additionally, overall network operation could be centrally managed by the network operator based on e.g., prevailing operational conditions in the network, changes in user population and/or makeup of users at the venue, business models (e.g., to maximize profitability or provide other benefits), spectrum channel changes or withdrawals, or even simply to enhance user experience using one radio access network (e.g., 3GPP-based 3G/4G/4.5G network) when another radio access network (e.g., WLAN) is sub-optimal for whatever reason.

For example, the service provider network 100 aggregated and/or analyzed subscriber- or account-specific data (including inter alia, particular mobile devices associated with such subscriber or accounts) as part of the provision and planning for services to users. As but one example, device-specific IDs (e.g., MAC address, unique device or component identifier, or the like) were used to identify subscriber account data maintained at, e.g., the network headend(s) within the core network 102 so as to permit or at least facilitate, among other things, (i) user authentication; (ii) correlation to particular subscriber groups or demographics, such as for accounting of data usage; and/or (iii) determination of subscriber privileges and access. Notably however, for various privacy and/or security reasons, such sensitive information and control has historically been performed only within the core network with stringent security.

Figure 1C:
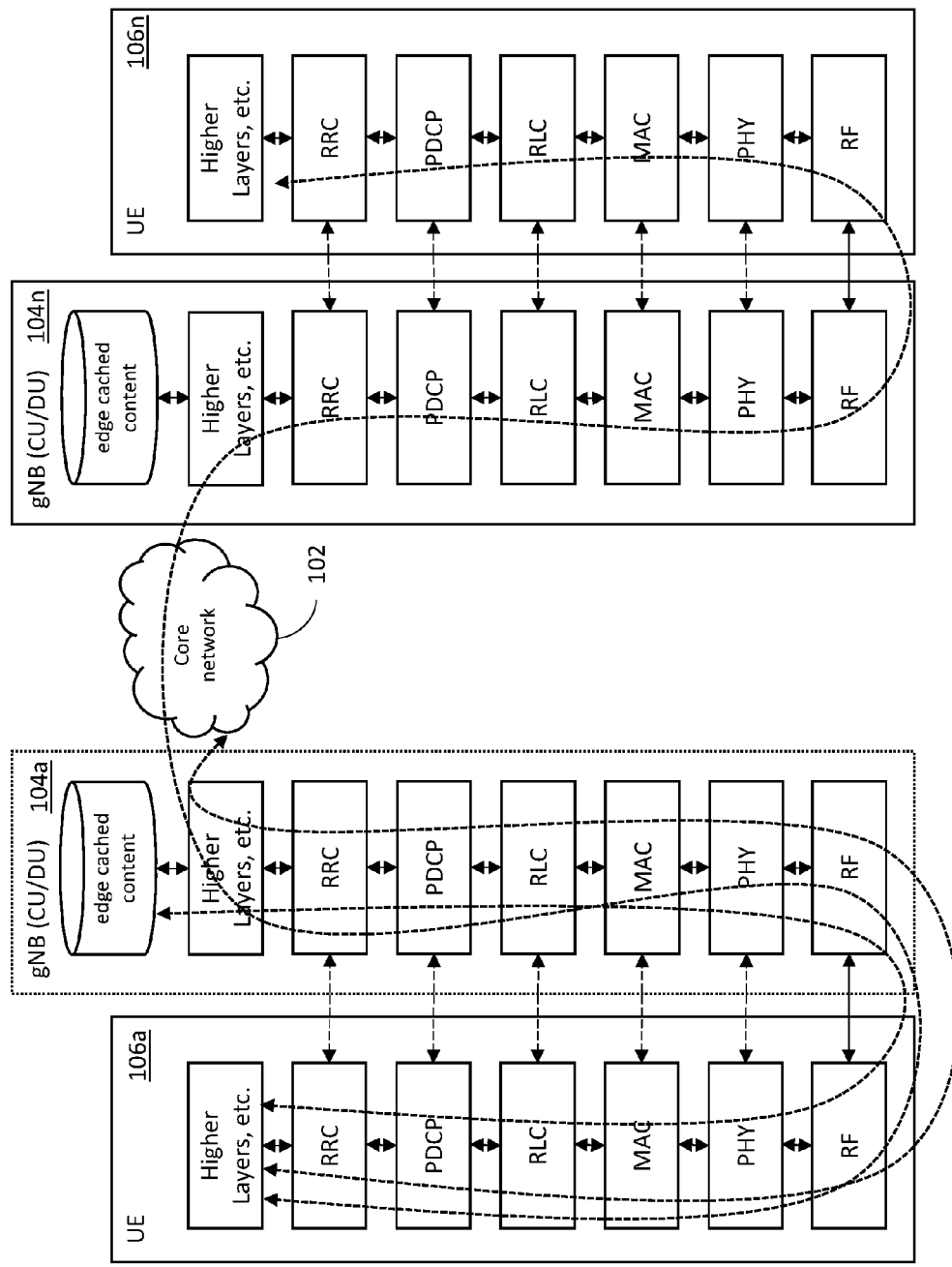
FIG. 1C is a logical representation of various communication links within one exemplary Next Generation Radio Access Network (NG-RAN) network, useful to illustrate various aspects of the present disclosure.

FIG. 1C is a logical representation of communication links for existing cellular networks. As shown therein, a UE can: (i) communicate with another UE (e.g., UE 106a to UE 106n), (ii) retrieve and/or store content at the local gNB (e.g., UE 106a to gNB 104a), and/or (iii) access the core network 102 and/or the broader Internet. Notably, each of the foregoing communication links requires that the UE 106 establishes a Radio Resource Control (RRC) connection with the gNB 104 via the aforementioned communication stack.

The Radio Resource Control (RRC) layer is used to control connection status in 3GPP networks. Specifically, the major functions of the RRC protocol include connection establishment and release functions, broadcast of system information, radio bearer establishment, reconfiguration and release, RRC connection mobility procedures, paging notifications and some limited power control. The RRC protocol is used by the network to configure the user and control planes according to the network status so as to implement various radio resource management strategies. Traditional networks use a single RRC connection to provide service for all data access requests from higher layers (regardless of logical endpoint.)

Cellular networks were originally designed to provide wireless coverage in geographic areas called "cells." Traditionally, cellular base stations provide data to mobile devices via a "downlink" frequency and receive data from mobile devices via an "uplink" frequency. Due to the expensive costs for leasing radio frequency bands from the government and the substantial capital outlays for base stations, cellular network operators tightly control frequency usage. Notably, existing 3GPP networks were designed around the cellular network paradigm and have always assumed that a UE would communicate with other logical entities via a cell (provided by a gNB, base station, wireless access point, etc.). Cellular network planning entailed significant trade-offs in terms of the cost of base station deployments and maintenance, geographic coverage, and service density. For example, some cellular service providers invested significant amounts of capital to provide high bandwidth networks in densely populated metropolitan areas, whereas other cellular service providers provided lower bandwidth over much larger areas (even providing service in sparsely populated rural areas).

Fog Networks and Edge Device Participation—

Figure 2A:
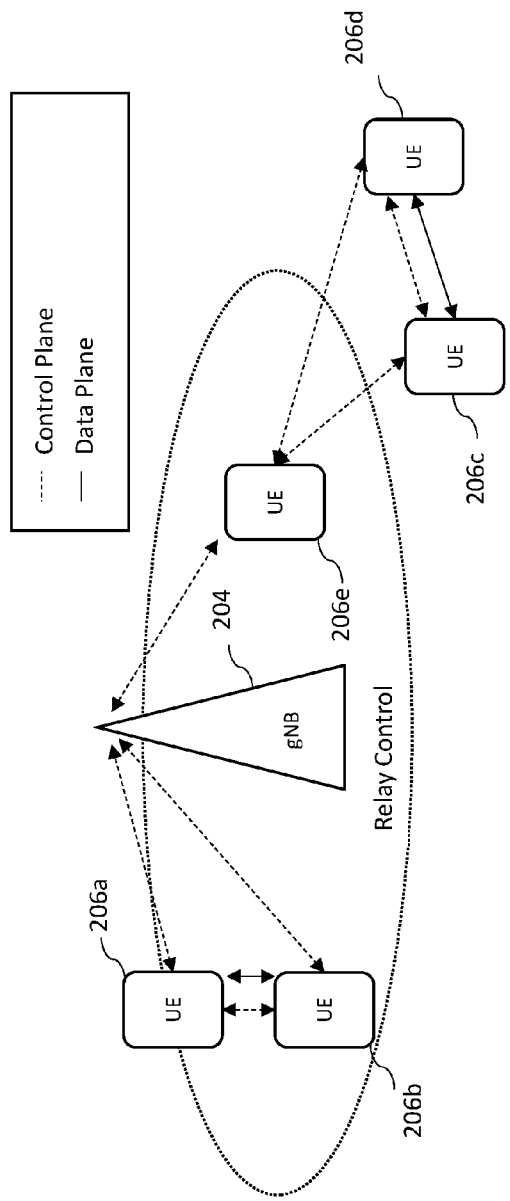
FIG. 2A is a logical block diagram of device-to-device (D2D) communication within an exemplary Next Generation Radio Access Network (NG-RAN) architecture, useful to illustrate various aspects of the present disclosure.

Incipient research into so-called "fog" networks attempts to introduce device-to-device (D2D) proximity based service provisioning into the context of cellular networks. For example, FIG. 2A is one graphical representation of an exemplary network architecture useful to illustrate D2D communications. As shown therein, the gNB 204 controls operation of multiple UEs 206 either via direct communication, or indirectly via relay communication. In particular, UE 206a can communicate via D2D communications with UE 206b; this pair of UEs is in direct communication with the gNB 204 for control plane operation. In contrast, UE 206c can communicate via D2D communications with UE 206d; however, UE 206c and UE 206d are out of direct communication with gNB 204 and receive their control plane instructions via UE 206e. Common examples of relay devices include without limitations, e.g., a base stations (such as the gNB 204), user devices (such as the UEs 206), access points, distribution unit apparatuses, routers, and/or other similarly capable devices.

As an aside, a "fog network" as described herein generally refers to a network architecture, interconnected via wireless or wired means, that utilizes two or more client devices located near the "edge" of the network (i.e., proximate to user devices, usage premises, etc.) to enable a given client device to execute operations related to computations, storage operations, and/or data communication, particularly with respect to one or more other client devices. Such operations are performed locally rather than routed through a server entity over the Internet backbone, as was done in previous network architectures (e.g., cloud-based networks), thereby reducing the amount of data transported to the cloud for processing, analysis, storage, etc. Such operations may also be done in conjunction with cloud-based networks; e.g., resource-intensive operations may still be performed at cloud servers despite being disposed further from the endpoint.

Referring back to FIG. 2A, existing relay devices may pass control information via the control plane. Control information enables UEs to setup and transact data between one another in device-to-device (D2D) links. For example, the gNB 204 may provide control plane signaling to UE 206e, which is relayed to UEs 206c, 206d. Subsequently thereafter, UE 206c and UE 206d can use control plane data to establish a direct D2D data connection; thereafter data may be exchanged via the data plane.

As a simple example of a "fog networking" scenario, a client device (e.g., UE 206c) may request data resident on a second client device (such as e.g., UE 206d). Assuming that the client device UE 206c has access privileges to the data, the second client device UE 206d may transmit the data directly to the client device UE206*c* (or be relayed through one or more other client devices and/or base stations) within the "fog" network, obviating the use of a server or backend. 5G-based implementations of the fog network can dramatically improve user experience, e.g., allowing for much greater data transfer speeds (multi-Gbps) and lower latency (down to 1 ms or less).

Figure 2B:
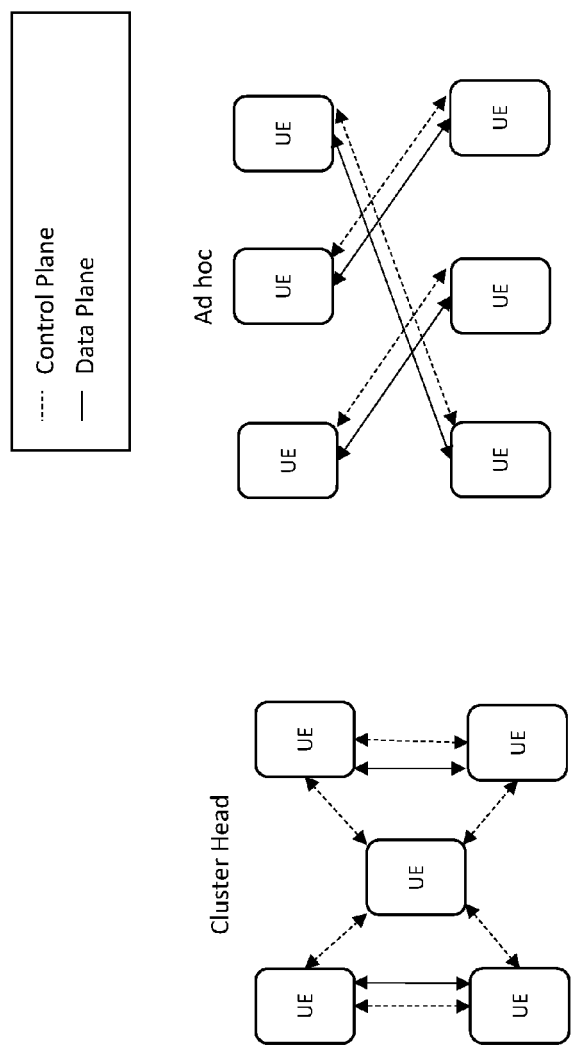
FIG. 2B is a logical block diagram of various types of device-to-device (D2D) proximity based service provisioning, useful to illustrate various aspects of the present disclosure.

FIG. 2B illustrates some common examples of device-to-device (D2D) proximity based service provisioning. For example, so-called "cluster head" network configurations identify a group of UEs that are "clustered" together. The cluster is "established" by selecting a "cluster head" for the cluster; typically a cluster head selection is selected to minimize network management overhead (e.g., a cluster head should have the most direct connections of the cluster, for as long as possible).

Another common configuration is an "ad hoc" network, wherein each UE identifies and establishes an ad hoc communication to another UE on a temporary ad hoc basis. In some ad hoc networks, the devices must be sufficiently proximate so as to be immediately detectable via beacons or other types of signals that prompt nearby devices to send a return message (including, e.g., a Service Set Identifier (SSID) in the message). In other ad hoc networks, a user device may connect to another user device that is too distant for a direct communication link, yet able to communicate via intermediary devices in the fog. Most ad hoc networks are limited to two entities (a point-to-point connection); although higher order ad hoc networks may be used with equal success (partial and/or full mesh networks). Historically, higher order ad hoc networks often require more resources than was available on mobile devices (e.g., power and/or bandwidth capabilities), however device capabilities have greatly improved enabling such operation.

Both cluster head and ad hoc configurations enable D2D exchange of data via wireless means by transmitting data directly to another user device. Such wireless means may include 3GPP-based protocols (e.g., 3G, 4G, 5G, 4.5G, 4G/5G hybrid protocols as described elsewhere herein). However, the present disclosure is not so limited and at least portions may be implemented with various other types of long- and short-range wireless connectivity, e.g., WLAN (e.g., Wi-Fi or based on other IEEE Std. 802.11), Bluetooth (including Bluetooth Low Energy (BTLE)), 3G cellular, infrared, radio-frequency identification (RFID), near-field communication (NFC), and Global Positioning System (GPS).

Figure 2C:
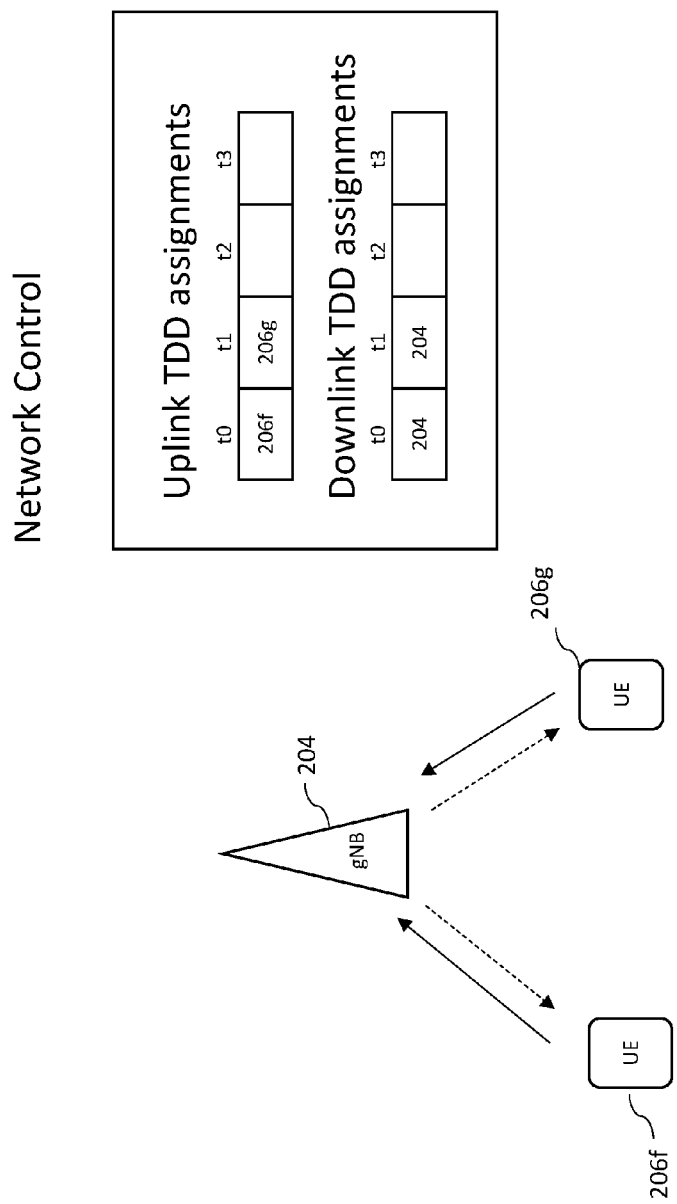
FIGS. 2C-2F are graphical representations exemplary a bidirectional packet exchange, useful to illustrate various aspects of the present disclosure.

FIG. 2C illustrates a bidirectional packet exchange between two UEs. As shown therein, each UE 206 is allocated a time slot. As shown therein, UE 206*f* and UE 206*g* transmit their packets during their respective timeslots; thus, UE 206*f* transmits at timeslot t0, and UE 206*g* transmits at timeslot t1. The gNB 204 has dedicated resources and can transmit during its any of the timeslots (t0, t1).

Figure 2D:
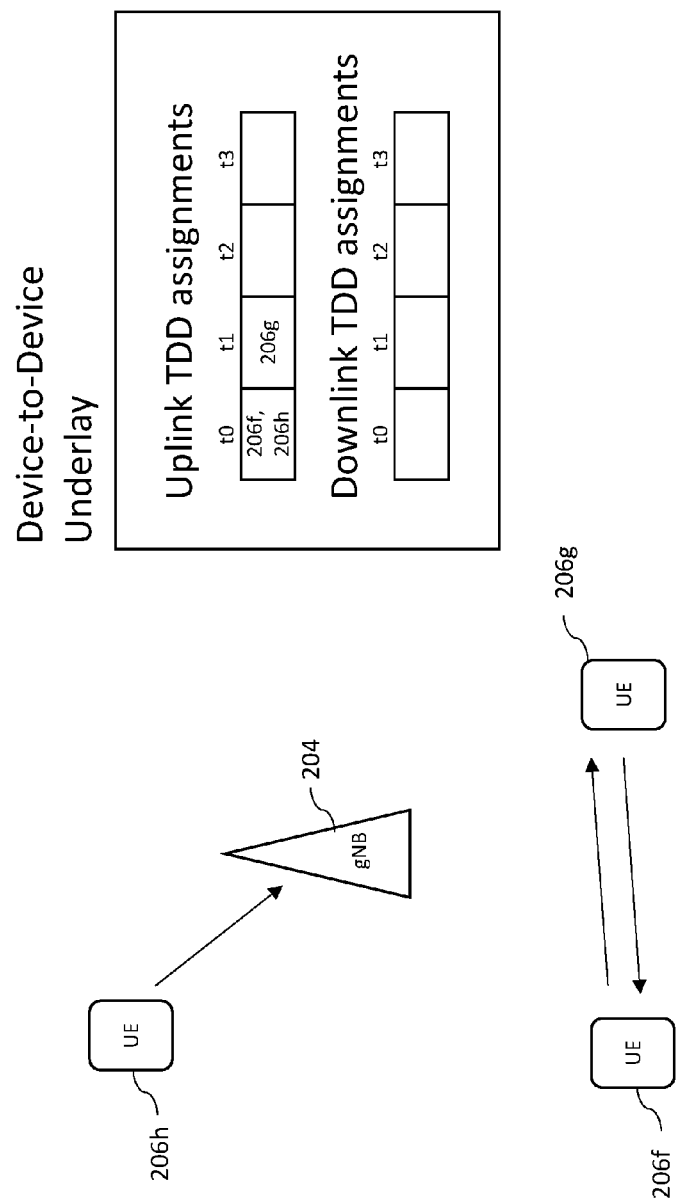

In contrast, FIG. 2D illustrates a bidirectional packet exchange using a D2D "underlay". As shown therein, UE 206*f* is assigned a first uplink timeslot (t0) and UE 206*g* is assigned a second uplink timeslot (t1). However, rather than using the timeslots for transmissions to the gNB, UE 206*f* and UE 206*g* directly communicate with one another without the benefit of further gNB 204 control. Notably, once the gNB 204 has assigned time slots to the UEs 206, the UEs 206 individually manage their shared resources. In some cases, the gNB 204 can even reuse resources that would otherwise be used to manage UE 206*f* and UE 206*g*; for example, by allocating those resources to a different UE (e.g., UE 206*h*). This style of networking is also referred to as "D2D underlay."

As used herein, the term "underlay" refers to an interfering allocation of resources. In contrast, the term "overlay" refers to an allocation of resources that preserves orthogonality and minimizes interference. Generally, underlay type operation results in worse performance but can be used to support a larger population with "reuse gain" (e.g., resources that would otherwise be reserved can be reused with interference mitigation).

Figure 2E:
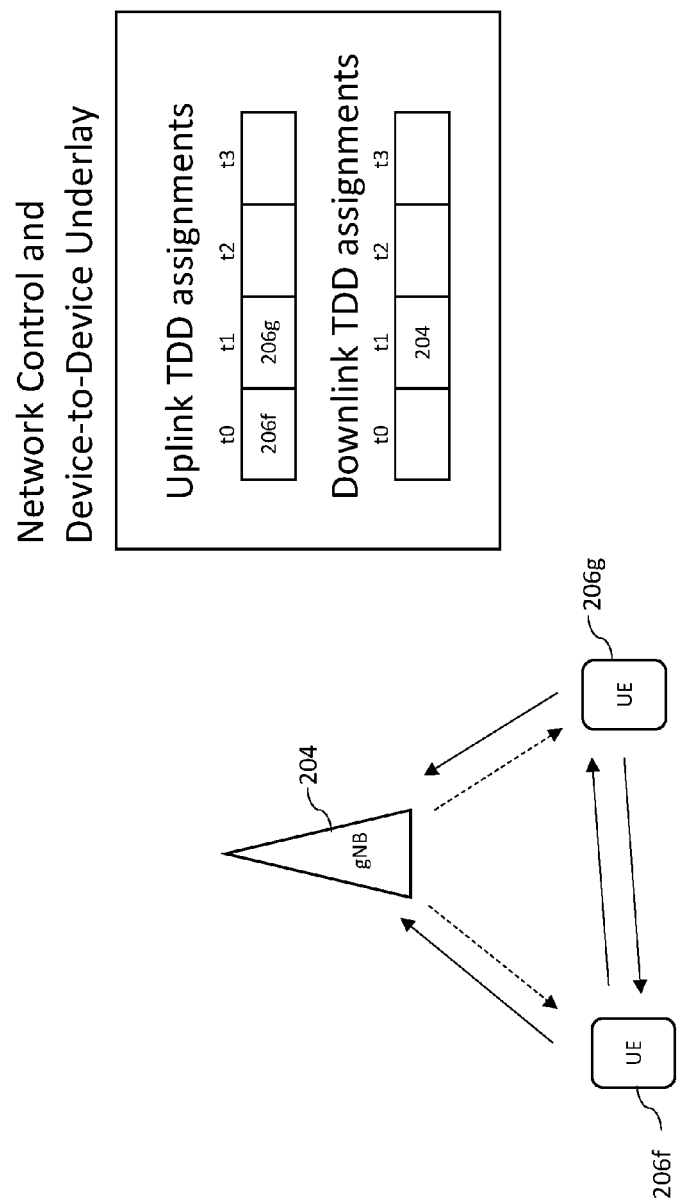

FIG. 2E illustrates yet another network topology where UE 206*f*, UE 206*g*, and gNB each broadcast their transmissions. As shown therein, during timeslot t0, UE 206*f* broadcasts data to both the gNB 204 and the UE 206*g*. Similarly, during timeslot t1 UE 206*g* broadcasts data to both the gNB 204 and the UE 206*f*. Finally, during timeslot t1 the gNB 204 broadcasts data to both the UEs.

Figure 2F:
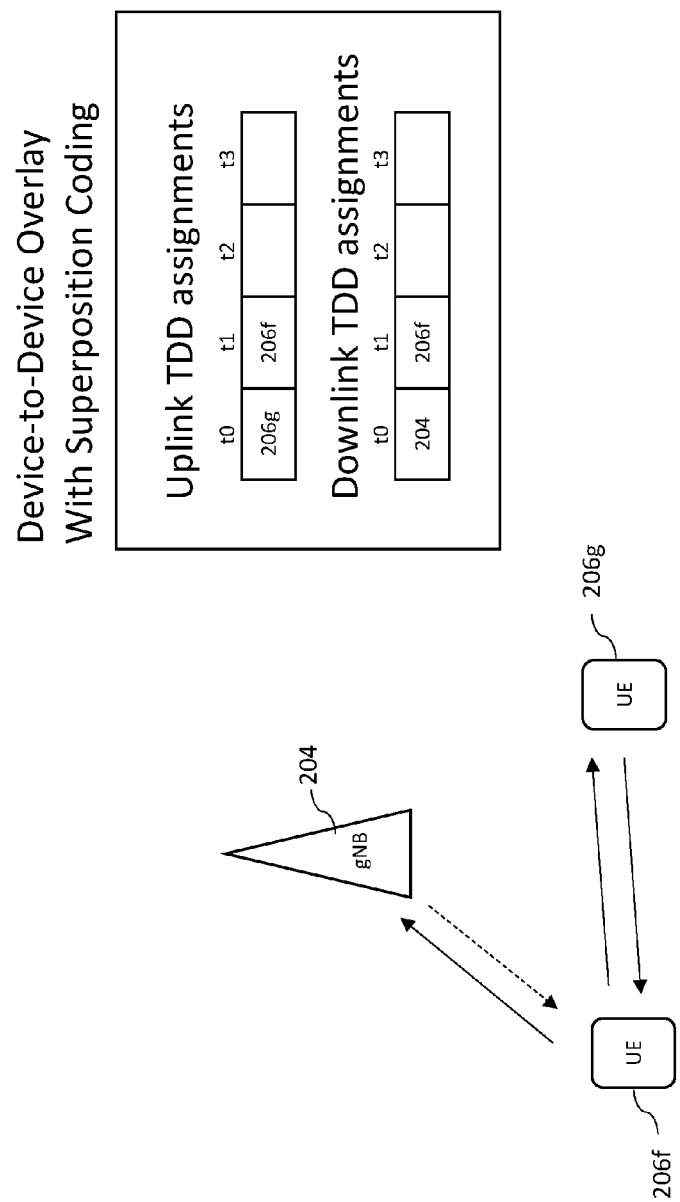

FIG. 2F illustrates a "relay" topology. As shown therein, during timeslot t0, the UE 206*g* and gNB 204 each transmit data. Then during timeslot t1, the UE 206*f* transmits on both uplink (toward gNB 204) and downlink (toward UE 206*g*). Notably, in FIG. 2F the UE 206*f* uses both uplink and downlink frequency bands (the UEs 206 in FIGS. 2C-2E only used uplink frequency bands).

Artisans of ordinary skill in the related arts will readily appreciate that fog networking entails more than mere improvements to UE device capability. Fog networks are designed to enable communication, computation, and/or storage at the point of the network that is closest to likely use. For example, D2D communications are locally managed, rather than via a central network. Similarly, data is cached nearest to where it is used rather than in the cloud. Moreover, device-specific processing is performed at the edge rather than in the "cloud." More directly, fog networks seek to self-organize in a manner that efficiently enables activity.

Using a Confluence of User Routines to Predict a Fog Network—

Recent advances in memory and wireless technologies have enabled user tracking to an unprecedented degree in a variety of different disciplines (e.g., "big data" personalization, social networking, surveillance, personal tracking, etc.) One revelation made possible by the ubiquity and details of user tracking is that the vast majority of consumers may have common routines which may be idiosyncratic, but are relatively stable.

For example, a particular user may favor a specific coffee shop or regularly visit a dog park for no discernable reason other than their individualized taste. Providing advertisements to such a user is often of limited value; e.g., the user is unlikely to try a new coffee shop when they already have a favorite nearby, and the coffee shop has no interest in buying advertisements for regular customers. Additionally, idiosyncratic tastes are peculiar to an individual and may or may not be driven by any commercial interest, nor are such tastes predictive of other's behavior. A user may prefer a dog park for no reason other than the availability of used tennis balls discarded by other dog owners. For these reasons and others, existing big data mining and analytics have had limited success beyond very broad generalizations despite immense commercial interest in user tracking.

In other words, a huge amount of data can be (and already has been) gathered from the ephemera of a user's day-to-day activity which may predict user routines and/or preferences. Yet, the richness of information has heretofore been only mined for advertising and similar commercial interest. Routine data has been poorly utilized to improve the user's mobile experience. Within the context of fog networks, user routine information can take on a wholly different role and importance as a predictor of user location and/or fog network resource availability.

Figure 3:
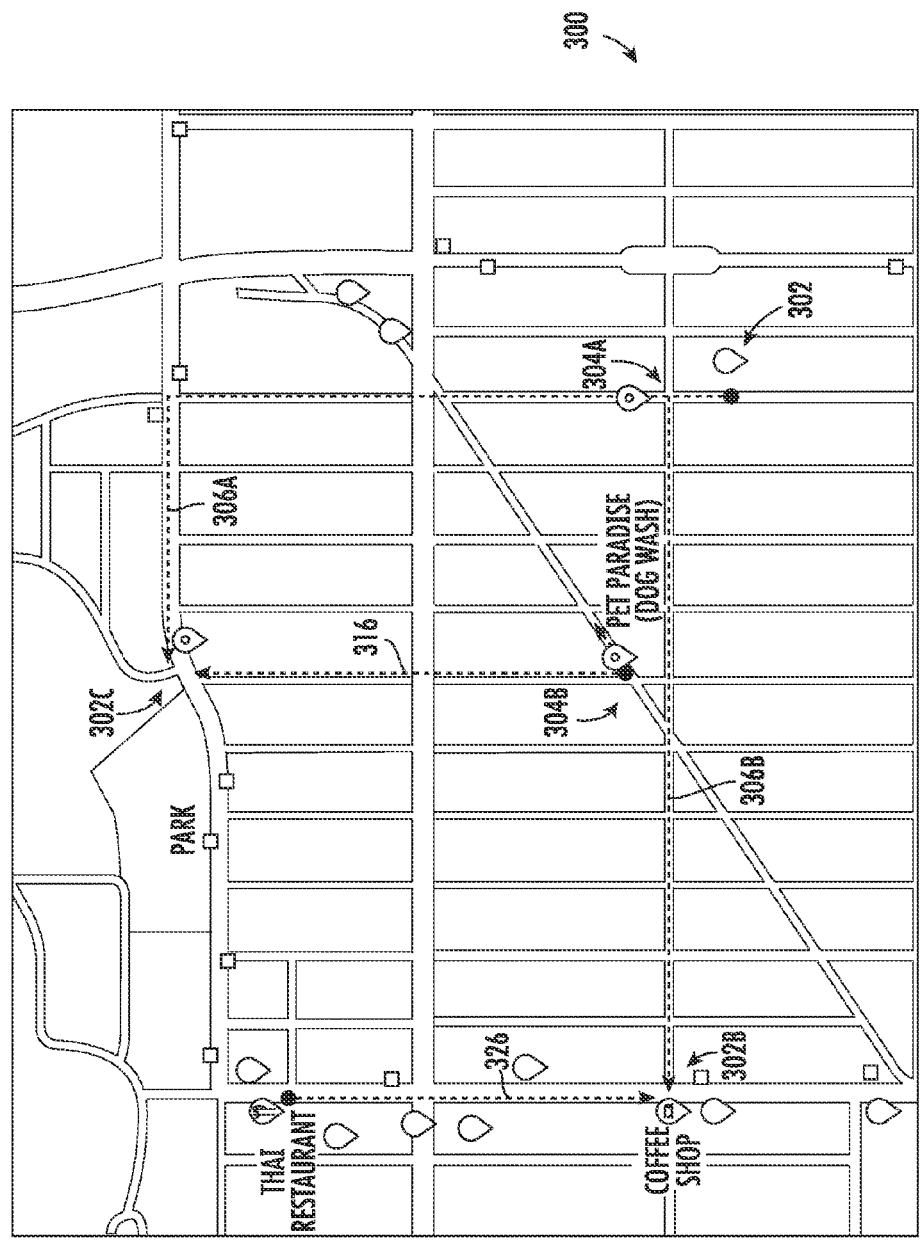
FIG. 3 is a graphical representation of a user routine, useful to illustrate various aspects of the present disclosure.

Consider the illustrative scenario of FIG. 3, a first user's afternoon routine after work may include e.g., leaving their house 302A and either getting a coffee or walking their dog. Notably, since the first user tends to walk the same routes every afternoon, the first user's heading at the intersection 304A can be used to determine whether the first user is headed to the coffee shop 302B via route 306A, or the dog park 302C via route 306B with relatively high certainty.

At around the same time, a second user working at a dog wash usually either: heads next door to chat with a neighboring business, or takes dogs to the same dog park 302C. As shown, the second user's heading at the intersection 304B can be used to determine whether the second user is headed to the dog park 302C via route 316. A third user getting Thai food is likely to get coffee at the coffee shop 302B after their meals.

In the example of FIG. 3, the "confluence" of user routines can be used to predict whether or not fog networks can be established far in advance of the users bumping into each other. For example, if the first user takes route 306A and the second user takes route 304B at about the same time, then there is a high certainty that the two users will be within close proximity to one another at the dog park 302C. Conversely, if the first user takes route 306B and the third user finishes their meal at about the same time, then there is a high certainty that the two users will run into each other at the coffee shop 302B.

Notably, the users may not know each other, or even be aware of one another; in fact the confluence of routines may be a chance overlap in paths. From a practical standpoint, chance meetings between different users are difficult to predict and virtually impossible to plan for. For example, blindly searching through the entire population of users for potential serendipitous path crossings is both impractical and unlikely to yield many fogging opportunities. Even if a chance meeting were identified ahead of time, the unrelated user devices are unlikely to have content of interest for the other user.

In contrast, once the first user has passed through the intersection 304A along route 306A and the third user walks along route 316, the nearly infinite number of potential fogging networking opportunities have collapsed into a single fog networking opportunity that is quite likely to occur within a window of time. Specifically, the near infinite number of possible fogging opportunities can be immediately narrowed down to only a few possible options because the time and location range is known e.g., the fog networking opportunity between the first and second user at the coffee shop 302B disappears as soon as the first user has selected path 306A. In this example, once the users have made their route selections for the morning, only the first user and the third user have an opportunity to create a fog network (barring non-routine delays). In other words, determining who will be at a specific time and location based on actual observable events is substantially less onerous than trying to orchestrate fog networks as they occur, or to predict fog networks based only on collected routine data.

In addition, the user's device activity may further narrow down the potential ways in which the fog network may be used. For example, the user's device activity may be used to predict what resources the user device needs and/or pre-seed those resources into the other user devices of the potential fog network. For example, if the first user is perusing news while walking along path 306A the third user's device may be pre-seeded with other news stories (for the first user) while walking on path 316. In this case, the pre-seeded news stories may not even be of interest for the third user. In fact, if the fog network materializes then the news story can be delivered to the first user's device and deleted from the third user's device; but if the fog network never forms, then the third user's device can delete the pre-seeded news story regardless. In other words, regardless of whether or not the content is consumed, the third user's device is only temporarily affected. Moreover, if a higher priority use for the memory occurs, then the third user's device can delete the pre-seeded content to optimize network operation (e.g., the first user's inconvenience is outweighed by the benefits of the higher priority usage).

As previously explained, device-to-device (D2D) networks used in existing fogging networks currently rely on control plane signaling provided via a gNB (see e.g., Fog Networks and Edge Device Participation, supra). The gNB control plane signaling authenticates the participants and/or allocates resources for the devices to communicate with (e.g., frequency bands and/or timeslots). In the context of cellular networks, control plane functionality guarantees security and prevents interference.

However, in the scenario of FIG. 3, control plane functionality can further leverage other aspects to streamline and/or even improve the security of fog network operation. In the aforementioned transfer, the third user device has pre-seeded news content for the first user; the pre-seeding has occurred entirely out-of-band from the D2D transfer between the user devices. In fact, the pre-seeded content may even be encrypted for the first user device (not the third user device). In other words, the third user device can't consume the pre-seeded content nor could a passer-by maliciously interfere with the transfer e.g., beyond blind jamming.

Moreover, the resources for transfer (e.g., timeslots and/or frequency bands) can be allocated only for the short window of possibility where a fog network opportunity exists. Analogous to the pre-seeded data example described above, the fog network resources can be reserved just prior to a fog networking opportunity and immediately reclaimed if the fog network does not materialize. Additionally, the nature of resources can be tailored for D2D transfer proximity; in some cases the bandwidths that are possible with D2D links may match and even exceed capabilities of cellular network links while minimally interfering with neighbors. For instance, the aforementioned device-to-device (D2D) communications may be performed with focused beam-forming antennas with tight transmission time intervals (TTIs) and broad bandwidths for comparatively short distances. D2D links over longer distances may require longer TTIs, narrower bandwidths (to avoid interference), and/or less beam-forming.

Still other permutations and/or variants of the foregoing example will be made clear to those of ordinary skill in the related arts, given the content of the present disclosure.

Methods for Identifying Fog Networking Opportunities Based on Routine Data—

As a brief aside, identifying that a fog network could occur ahead of time (a "fog networking opportunity") is substantially less onerous than allocating and/or orchestrating resources to establish a fog network in the moment. Specifically, the instantaneous network overhead associated with fog networking may include e.g., authentication, authorization, accounting, discovering nearby participants, verifying nearby participants, resource management, opt-in/opt-out and/or any number of other permissions. Network overhead traffic may be further constrained at the edges of traditional network coverage, where fog networking augments normal coverage. In other words, establishing a fog network at the edge of an existing network consumes network bandwidth that is already in short supply.

User routines can be used to predict when a user will encounter a fog networking opportunity e.g., minutes, hours, or even days in advance with varying degrees of accuracy. Handling networking overhead based on user routines is not time sensitive and can be performed when the user is not at the network's edge. In this manner, time-shifted network management and control can greatly reduce the instantaneous burden on network resources.

As a related benefit, many logistical issues can be handled in a non-time sensitive manner to maximize the probability that at least one fog networking opportunity will occur. Specifically, many fog networking opportunities may be identified ahead of time, providing overlapping coverage for the same user routine. Even though any individual fog networking opportunity may not materialize, in aggregate the probability that at least one of the fog networking opportunities will occur during the user routine may be quite high.

Additionally, time-shifting network management may improve user participation thereby broadening the fog networking participation base. The common perception of ownership of personal property includes the ability to control its use. By extension, user control in fog networking corresponds to the ability to opt-into or out-of fog networking. Current networks that support user opt-in/opt-out only offer a coarse grained "opt-in" or "opt-out" option so as to minimize interruptions (the transitory and potentially ubiquitous nature of fog networks would incessantly interrupt device operation otherwise.) Unfortunately, coarse grained control can be frustrating for users because the fog network may consume limited device resources while the user is using them. In fact, if the user suffers excessive performance degradation due to fog networking, they may decide to withdraw from the fog network unexpectedly which may adversely affect the other fog network participants. In view of the pitfalls of user opt-in/opt-out, some networks that support fog networking have proposed commandeering devices without user consent, which may be even more undesirable in view of pervading consumer expectations.

The various embodiments of the present disclosure can offer fine grained control of device usage in a non-time sensitive manner. In particular, users can opt-in or opt-out of fog network participation according to personally meaningful contexts in e.g., time, location, activity, etc. For example, users may be able to opt-in when they are "on their commute" and opt-out when they "are at work." Additionally finer control is also possible, for example, a user may be able to limit the amount of processing for the fog network when they are "watching football on Sundays," but freely participate as a peer-to-peer server for the watched football game (e.g., limit processing power with an exception for specific content requests).

Figure 4:
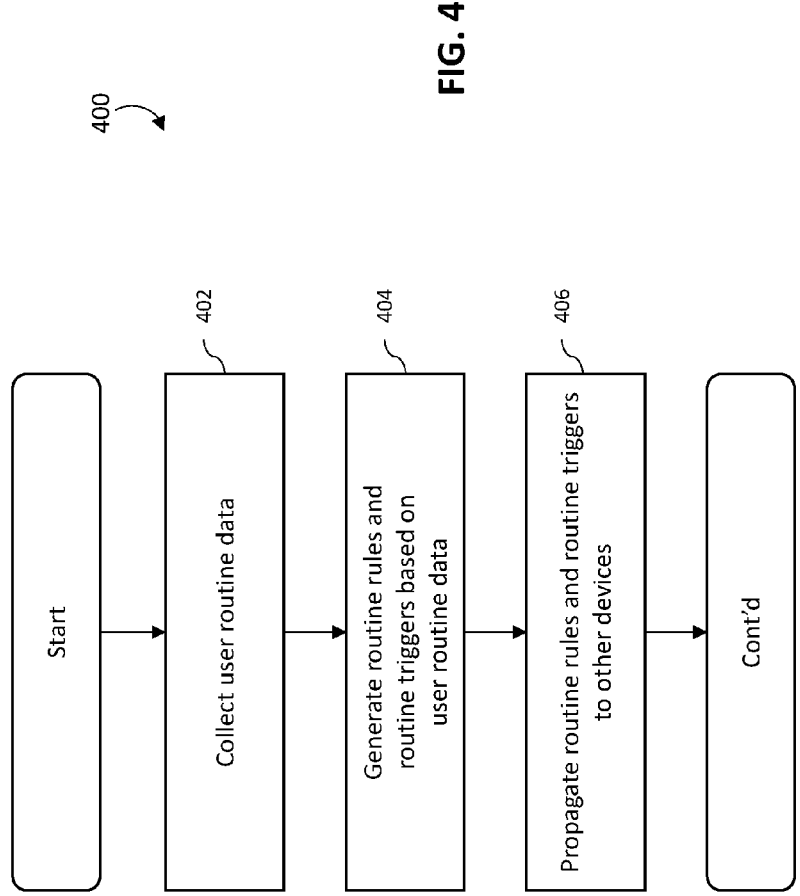
FIG. 4 is a logical flow diagram of an exemplary method for identifying fog networking opportunities, in accordance with the various principles described herein.

Referring now to FIG. 4, a logical flow diagram of one exemplary method 400 for identifying fog networking opportunities is presented. A fog networking opportunity occurs whenever a confluence of one or more user routines in time, geography, resources, or other considerations may be used to establish a fog network. Notably, the fog networking opportunity need not actually materialize (and may be probabilistically weighted). Moreover, a fog network may not have determinate members. For example, a single device may broadcast data for any nearby devices to consume, without knowing whether or not any device receives the broadcast.

At step 402 of the method 400, a device collects user routine data. In one exemplary embodiment, the device is a user device associated with a user (e.g., a laptop, phone, tablet, personal fitness device, personal media device and/or other personal device). In other embodiments, the device (e.g., a base station, an access point, a network controller, or other networking entity) may be tracking a user device. In still other embodiments, the device (e.g., paypoint, Internet of Things (IoT), cameras, beacons, and/or any number of other active or passive monitoring devices) may be collecting the ephemera of user data that is thrown off by any number of personal interactions that may be associated with a user routine.

As used herein, the term "user" refers to an entity (human or otherwise) that interacts with a networking infrastructure to e.g., transmit and receive data. While the present disclosure is generally presented within the context of a single human user, artisans of ordinary skill will readily appreciate that the various techniques described herein may be applied to a broad array of user entities. For example, a group of humans that use (or are monitored by) a common device for repetitive tasks might be treated as a single "user" (e.g., factory workers for different shifts). In another common example, certain fleet tracking and/or other machine-to-machine applications may have machine "users" that are entirely non-human. Yet another example of non-human users are animals. For instance, animal "users" may be studied for wildlife management; researchers can collar a population of animal users. When the animals routinely congregate e.g., at a watering hole, small fog networks can share or distribute collected data to nearby peers and/or stationary monitoring stations (thereby allowing researchers to track the entire population with minimal invasiveness).

As used herein, the term "routine data" refers to data regarding observable events that may have predictive value. While the present disclosure describes patterns of repetitive user behaviors, artisans of ordinary skill will readily appreciate that other techniques for predicting future activity may be substituted with equivalent success. General information regarding typical traffic may have predictive value for new users (e.g., even where there is no repetition). For example, people entering a museum may view the exhibit halls in a particular order; this pattern of viewing may be imputed to all new museum visitors. Additionally, it is further appreciated that the predictive value may be increased and/or decreased by e.g., the degree of repetition, the importance of different events, the accuracy of observation, the sampling size, and/or any number of other features.

As used herein, the term "predictive value" refers to the likelihood that an observed event predicts a future event that will (or will not) occur. In one exemplary embodiment, the predictive value is assessed as a statistically weighted value. In some embodiments, predictive value may additionally balance the benefits of successful prediction versus e.g., the cost of a false positive and/or a false negative. Such costs and/or benefits may measured in terms of e.g., monetary value, physical resources (such as time/frequency, etc.), device activity, performance, user experience, and/or any other quantifiable metric. For instance, even though an event may be quite likely, the cost of a false negative/positive may result in a lower predictive value. Similarly, an event that is unlikely may be assigned a high predictive value if the benefits substantially outweigh the costs. In some variants, the predictive value may also differently weight benefits between e.g., the user, other participants of the fog network, and/or network considerations. More generally, artisans of ordinary skill in the related arts, given the contents of the present disclosure, will readily appreciate that any scheme for assessing predictive value and/or different measures of predictive value may substituted with equivalent success.

Common examples of user routine data include e.g., geo-tracking data, social media posts, financial transaction records, call and messaging data, nearby user data, nearby base station and access point data. More generally, user routine data may include, without limitation, any variation and/or combination of e.g., geographic location, velocity, acceleration, time and/or date stamps, frequency, accumulated time, activity data (e.g., biometrics, financial transactions, device usage, resource consumption, etc.), and/or personally idiosyncratic information (e.g., user schedules, user tags, etc.). Artisans of ordinary skill in the related arts, given the contents of the present disclosure, will readily appreciate that the foregoing examples are purely illustrative and that a wide variety of data may be substituted with equivalent success.

In one exemplary embodiment, user routine data may be associated with a single user and a single device. However, as previously noted, a "user" may be a group of entities and similarly, a "device" may be a group of devices. Thus, by logical extension, various other embodiments may associate user routine data with e.g., multiple users and/or multiple devices.

While the various described embodiments are based on "collected" user routine data (e.g., collected from observations of previous user behaviors), it is appreciated that user routine data may be received, inferred, and/or created with techniques other than direct observation. For example, user routine data may be received from other sources (e.g., the user may provide user routine data, $3^{rd}$ party services may sell records of user routine data, etc.) In another example, user routine data may be inferred from observable events. For example, a hiker's general velocity and location can be inferred from his entry onto a hiking trail and exit therefrom even without tracking the hiker through the trail. In still other examples, "default" user routine data could be created under certain circumstances; e.g., where a user may have manually entered their home location, work location, and a rough work schedule, within a calendaring application. Moreover, various combinations and/or variants thereof may be substituted with equivalent success; for example, an initial default user routine data set may be tailored with subsequent data collection to "fine tune" the user routine data.

In one exemplary embodiment, user routine data may be collected periodically (e.g., at regular time intervals). In other embodiments, user routine data can be aperiodically collected and/or intermittently collected. In some variants, intermittent collection may be triggered based on various system considerations. For example, user routine data collection may only occur when its predictive value falls below a specified threshold. In other words, the user routine data can be discarded (and/or ongoing user routine data collection can be de-prioritized) where the user's routine has not substantially changed. In another such example, user routine data collection may only occur when there is sufficient power, memory, and/or processing capability to monitor user behavior. Common examples of system considerations include e.g., device resources and considerations (the aforementioned memory and processing capability as well as e.g., bandwidth, current tasks, prioritization schemes, etc.), network resources and considerations (e.g., network congestion, traffic load, quality of service, etc.), user considerations (e.g., user experience, responsiveness, latency, throughput, power consumption, performance, etc.) Still other considerations and/or triggering events may be used to collect user routine data.

For example, the user may explicitly identify salient points or conditional events during which user routine data can be collected. Consider a scenario where the user wants to regularly track their own routine for personal interest (e.g., the amount of time spent at work, at leisure, and/or asleep). In such a situation, the user may enable their device during "tagged" salient points such as "work", "leisure", "sleep", etc. In related scenarios, a user may track another user's activity (e.g., parental controls, social networking type applications, workforce management, etc.); in some such variants, the user may need to request permissions to view the other user's activities for security and/or privacy reasons. For instance, a parent could configure their teenager's phone to start monitoring the teenager's whereabouts throughout the course of a day. In another related scenario, a network operator (or other networking entity) may be able to track user routine data for marketing purposes. In some cases, law enforcement can seek a warrant to collect public user routine data e.g., for convicted felons and/or to identify the location of suspects and/or witnesses for criminal investigation.

In still other embodiments, the user routine data may be explicitly provided and/or augmented by other sources of user information. For example, the user's own calendaring applications and social networking activity as well as other user's calendaring and social networking activities can be used to infer user routine data. Empirically, most users have a strong inclination to appear at locations and/or events that they themselves scheduled or that they've been invited to.

Various other sources of user routine data may be substituted by artisans of ordinary skill in the related arts, given the contents of the present disclosure.

At step 404 of the method 400, routine rules and/or routine triggers based on the user routine data are determined. In one exemplary embodiment, the routine rules and/or routine triggers are determined by the user device associated with the user. In some cases, the routine rules and/or routine triggers may be further informed or tailored based on explicit user choices. In other cases, the routine rules and/or routine triggers may be passively adjusted over time based on continuing collections of user routine data. In some embodiments, the routine rules and/or routine triggers are determined by an external network entity (such as a network controller, fog network entity, or other coordinating network entity) based on network considerations.

As used herein, the term "routine triggers" refers to mechanisms and/or logic configured to monitor observable events that have sufficient predictive value to warrant execution of one or more routine rules. For example, a routine trigger may correspond to a first direction of travel in a first geographic location at a first date and time range that predicts a fog networking opportunity at a second geographic location at a second date and time range. While the foregoing example is presented within the context of a number of "conditional" requirements (i.e., conditions that must be met), artisans of ordinary skill in the related arts, given the contents of the present disclosure, will readily appreciate that a variety of "weighted" routine triggers may use less concrete factor based analysis. For instance, a probabilistic approach may consider a variety of different factors that are individually assessed and assigned a probabilistic weight that when taken together may predict future events. Similarly, machine learning, artificial intelligence, and/or other fuzzy logic type analysis may identify and ascribe various degrees of correlation and/or causation to a variety of factors. Still other mechanisms and techniques may be substituted with equivalent success, the foregoing being purely illustrative.

As used herein, the term "routine rule" refers mechanisms and/or logic configured to execute a sequence of actions in preparation for, or upon the occurrence of a future event. For example, a routine rule may include downloading content and/or reserving bandwidth (or networking resources) to transfer the downloaded content to another user that may be present at a fog networking opportunity characterized by a geographic location at a date and time range. In another example, a routine rule may include minimizing non-essential tasks so as to provide processing cycles for the fog networking opportunity. In still another example, a routine rule may include assigning (or identifying) a fog network master and/or resources for a fog networking opportunity.

In one exemplary embodiment, user routine data from one or more users is processed to identify observable events that are associated with future events. A successful identification of one or more observable events having a correlation to a future event that exceeds a minimum predictive value can be assigned a routine trigger. In one exemplary embodiment, the identification of routine triggers can be performed with hardware and/or digital signal processors common in the related arts. Other forms of correlation may include e.g., machine learning, probabilistic correlations, artificial intelligence, and/or any other form of pattern matching techniques.

Routine triggers can be identified in a variety of different ways for a variety of different purposes. For example, a network operator that seeks to reduce coverage holes may take a collection of user routine data around a location (e.g., the geographic position of the coverage hole) to identify correlations between users that frequent the location; these candidates can be used to "patch" the coverage hole. In contrast, a user device that seeks to identify a complementary peer device to cache content with, or share processing power, may take a collection of user routine data and search for other users having appropriate complementary features; these candidates can be contacted for subsequent fog network opportunities. In other cases, a user device may want to participate in fog networks for monetary compensation and/or other incentives. Such a user can review their user routine data to identify peak times and/or locations where the network is highly congested (e.g., when monetary compensation for fog networking may be highest). Still other schemes will be readily appreciated by artisans of ordinary skill, given the content of the present disclosure.

In one exemplary embodiment, once a routine trigger is identified, then a corresponding routine rule can be created that identifies the action to be taken in preparation for, or performed at, the future event. For example, a routine trigger that predicts when a user device will enter a specific area and lose coverage may be assigned with a routine rule that identifies a nearby user device for a fog networking opportunity. In another such example, a routine trigger that predicts when a user device will request content may cause execution of a routine rule that identifies a nearby user device having a pre-seeded version of the requested content. In some cases, the routine rule may even instruct the nearby user device to pre-seed the requested content to prepare for e.g., the imminent fog networking opportunity.

In some cases, the routine rule may additionally activate other routine triggers and/or routine rules. In one such exemplary embodiment, the routine triggers and/or routine rules are hierarchically tiered. For example, multiple devices may enter or exit a fog network; the fog network may dynamically assess different routine rules based on the devices that are, will be, and/or were present. Various routine rules and/or routine trigger events can be dynamically escalated and/or pruned based on the various entrances and exits.

As previously alluded to, the uncertain nature of fog networking opportunities may result in content and/or resources which are pre-emptively seeded or allocated. If the fog networking opportunity does not materialize than the seeding or allocation can be immediately removed or removed when needed. In some cases, the routine trigger and/or routine rule may have an explicit "termination clause"; e.g., when the termination clause occurs, the routine trigger and routine rule can be deactivated. For example, a routine rule to download content for another user may have an explicit termination clause if the fog networking opportunity does not materialize within a certain time and/or location "window" or range. In other cases, the routine trigger and/or routine rule may have an implied termination; e.g., the routine, the routine trigger and/or routine rule can be deactivated passively in view of other system constraints. For example, a routine rule to download content can be overwritten when more pressing considerations arise (otherwise the routine rule remains active).

In some cases, the termination may arise based on the routine trigger and/or routine rule having been previously executed. As a brief aside, routine triggers and/or routine rules may be "oversubscribed" (when the routine triggers and/or routine rules are accepted by more devices than are needed or expected). Oversubscription may be used to offset the various uncertainties and/or marginal conditions under which fog networking opportunities may arise. In other words, multiple uncertain fog networking opportunities can provide sufficient redundancy so as to ensure that at least one of the fog networking opportunities is likely to materialize. However, since only a subset (e.g., one) of the participating oversubscribed devices needs to satisfy the oversubscribed request, once the subset of the oversubscribed routine triggers and/or routine rules has been satisfied, the remaining participating oversubscribed devices can terminate their corresponding routine trigger and/or routine rules.

Referring back to step 404 of the method 400, artisans of ordinary skill in the related arts will readily appreciate that routine rules and/or routine triggers may require complementary and/or supplementary behavior. As used herein, the term "complementary" refers to routine rules and/or triggers that require multiple actors to accomplish a common purpose. In contrast, the term "supplementary" refers to routine rules and/or triggers that may include multiple actors to optimize and/or improve performance of a common purpose. For example, a first device that is assigned routine triggers and routine rules for caching content, may complement the second device's routine triggers and routine rules for retrieving the cached content. In other embodiments, the routine rules and/or routine triggers may be supplementary. For instance, a first device may be assigned routine triggers and routine rules for caching content that tends to be frequently requested thereby supplementing the network capabilities; even though no counterpart recipient is known at the time of the assignment (or may even be known when the routine trigger/routine rule is executed). In another such instance, a first device may be assigned routine triggers and routine rules for caching content that is already being handled by a second device, thereby providing network redundancy.

In one exemplary embodiment, user routine data may be aggregated and/or consolidated from multiple different devices. In some embodiments, the aggregated user routine data is used to identify appropriate matches for complementary functionality. For example, a centralized network entity (e.g., a network operator) could parse through various user routine data and identify interlocking matches (e.g., a first device that needs resources and a second device having resources that is e.g., co-located in space and time). In other embodiments, the user routine data is used to identify candidates for supplementary functionality. For example, a centralized network entity could parse through various user routine data and identify areas where the network has poor coverage and can supplement its coverage with user assistance.

In another exemplary embodiment, user routine data may be aggregated and/or consolidated directly between the multiple different devices. For example, a first device may track nearby devices (a listing of candidate neighbor devices); over a number of repeated contact with a specific second device, the first device may contact the second device to exchange and/or negotiate future routine triggers and routine rules (with or without a centralized network entity).

In related embodiments, groups of user routine data may be used as the basis for other more sophisticated inferences and/or matching. For example, groups of users that frequently coincide within a spatial location and/or according to a regular schedule may be considered particularly secure or trusted for fog network matching. In other related examples, groups of users may be prioritized for connectivity, offer better incentives (e.g., reduced or free credit/debit rates for participation), offer "loyalty" rewards, enable special privileges, and/or disable security measures. Moreover, while the foregoing examples are made with reference to spatial and/or temporal matching, it is appreciated that any user routine data commonality may be substituted with equal success. For example, a group of users that have common interests may be prioritized even where they have never (or very infrequently) met before. As but one such example, annual conventions and/or networking events intentionally aggregate a variety of individuals from different regions/areas who rarely intersect.

In one exemplary embodiment, a network entity may identify and/or constrain routine trigger and/or routine rule determination based on network considerations. The network may consider other user behavior, user movement, fog network movement, other network considerations and/or forecasted outages. Consider a scenario where a fog network is composed of users on their daily commute along a highway that runs north-south. In the exemplary scenario, a first fog network has a common directional vector e.g., a fog network for the northbound lanes is composed of users that consistently move in the northbound direction. As a result, the northbound fog network can benefit from information specific to the northbound direction whereas other directions may be less important. For instance, information from other fog networks that lie northbound may alert the northbound fog network of e.g., upcoming accidents, police activity, and/or other traffic issues. Southbound information may be lower priority for the northbound fog network and can be deprioritized and/or ignored completely. In other cases, a user may want to prioritize other directional information; for example, a northbound traveler on a short errand may need to know whether an accident in the southbound lanes will affect their return trip. More generally, artisans of ordinary skill in the related arts will readily appreciate that the various aspects of the present disclosure may be used in a number of combinations and/or distributions for routine trigger and/or routine rule making.

It is commonly appreciated that network entities may be arranged in various layers of centralization; for example, a base station has control over its particular cells and sectors, whereas a core network entity may coordinate many radio access networks. As a result, routine triggers and/or routine rules that encompass many network entities may be most efficiently made at the corresponding level of centralized entity (e.g., to ensure that business agreements such as Quality of Service (QoS) agreements, user service agreements, network management, etc.) In contrast, artisans of ordinary skill (given the contents of the present disclosure) will appreciate that routine trigger and/or routine rule generation may tax network resources and/or be unnecessary for localized transactions. Thus, localized considerations may be better performed at e.g., edge devices, a fog network master, and/or as between direct peers. Hybrid embodiments may intermix analysis at a variety of different levels. For example, a user may configure their device to participate in the fog network. As a result the device may identify routine triggers, and the network may assign routine rules based on various network conditions. Still other variations thereof will be readily appreciated by artisans of ordinary skill given the contents of the present disclosure.

While it is readily appreciated that time and/or physical constraints are necessary to identify a potential fog networking opportunity, such factors are not the only considerations. One factor of importance may be similarity of activity e.g., where users may be requesting or transacting common or related content. Commuters that are in transit to a common or related venue (e.g., the same or related workplace) may actually benefit from e.g., sharing content. In some cases, the commuters may not personally know of one another, however their devices may provide introductions to nearby users that frequently participate in fog networking collaboration; e.g., the user devices may notify their users of their neighboring fog participants and/or the areas of interest and/or content that they generally overlap in.

Proximity is not always desirable. Even though two devices may be in close proximity and/or share similarity of activity to one another, such fog networks may be relatively low value to either or both of the network the users for other reasons. In particular, the network likely will be able to service both users or neither of the users (e.g., because they are both in-range or out-of-range) thus there may be network redundancy. In other words, the ability to establish longer range radio links may create and/or allow more redundancy for content and/or capabilities than the closest possible radio link. A managed network may choose to connect users which are farther apart, but which have access to different resources even at the expense of less link reliability, etc. For example, consider two commuters that are right next to one another. Each commuter may actually be configured to transmit and receive data via different fog networks that are farther away. This sparse configuration may actually enable more diversity of coverage when necessary e.g., either one of the two commuters may establish a short term local fog network with the other, so as to leverage the other's connectivity in the event of their own network loss.

Various embodiments of the present disclosure may further enable users to opt-in and/or opt-out of participation. As previously noted, the user may identify salient points or conditional events (e.g., "work", "leisure", "sleep", etc.). In one exemplary embodiment, the user may opt-in to fog networking and/or explicitly identify or constrain routine trigger and/or routine rule determination for such defined points or events. Alternatively, the user may opt-out of fog networking except for defined exceptions. For example, the user may explicitly enable his device to cache content for others and/or provide surplus processing resources for the fog network during sleep periods. In contrast, the user may consume fog network resources during leisure periods when he would like to preserve his own device resources and/or even extend his performance beyond the device capabilities. In some variants, the user may further identify particular users to network with e.g., for privacy reasons. For example, a user may only wish to form fog networks with people that are of his own social network or workplace. Similarly, a parent may restrict their children's devices to only accept connections to specific people.

Various embodiments of the present disclosure may additionally be paired with incentivization schemes, such as are described in e.g., co-owned and co-pending U.S. patent application Ser. No. 16/211,029, filed Dec. 5, 2018, and entitled "METHODS AND APPARATUS FOR INCENTIVIZING PARTICIPATION IN FOG NETWORKS", incorporated supra. In one exemplary embodiment, a user may configure their device to opt-in to any fog networking opportunity when available so as to provide for example, computational, storage, and/or network resources in exchange for fungible tokens. The user contributions may be recorded in a blockchain data structure, thereby enabling users to be compensated for their contributions of resources to the network at a later time. In other examples, a user may configure their device to opt-out of fog networking opportunity unless fungible tokens (or a minimum amount of fungible tokens) can be earned.

In some such embodiments, a network operator, another user, or some other entity (e.g., a gig-based service) may notify a user of areas where fog networks opportunities are needed. For example, a gig-based service may offer monetary rewards ("bounties") to incentivize its users to participate in a crowd-based fog network. The user may earn bounties, simply by showing up and allowing their device to create, complement, and/or supplement a fog network controlled by the gig-based service. In other cases, the network operator, another user, or some other entity may even suggest that a user take a different route to e.g., work so as to provide better fog networking coverage (and offer corresponding monetary incentivization).

At step 406 of the method 400, the routine rules and/or routine triggers are propagated to other devices. Propagation of requests may be made via unicast, multicast, and/or broadcast. In one such implementation, the propagated routine rules and/or routine triggers identify a sender and an intended receiver. In other implementations, the propagated routine rules and/or routine triggers may only identify a specific sender (e.g., broadcast to anyone that receives) or a specific receiver. Various techniques for propagation may include e.g., transmission via a network (e.g., an Internet Protocol (IP) network), peer-to-peer (P2P) network, device-to-device (D2D) network and/or other ad hoc networks.

The propagation may occur in-band (e.g., at a fog network opportunity, or within the fog network itself), or out-of-band (via other network connectivity, e.g., at home). For example, in-band propagation may be announced via e.g., periodic, intermittent, and/or aperiodic transmissions via a common control channel of a fog network. In some cases, a shared control channel may be used to distribute routine rules and/or routine triggers. In other cases, a shared control channel may configure participants of the fog network to establish a dedicated D2D channel to exchange routine triggers and/or routine rules. In still other cases, a dedicated channel may enable participants of the fog network to exchange routine triggers and/or routine rules directly.

Out-of-band propagation may be performed ahead of the fog networking opportunity. In some embodiments, out-of-band propagation may be performed minutes, hours, days, etc. prior to the fog networking opportunity. For example, a user device can propagate its routine triggers and routine rules (and/or receive routine triggers and/or routine rules from other user devices) when the user is at home, connected to their home Wi-Fi connection (or other network coverage). In another such example, the routine rules and/or routine triggers are pushed/pulled to the other devices while the other devices have control and data plane links to a cellular network.

In one exemplary embodiment, the routine rules and/or routine triggers are "pushed" to other devices. As used herein, the term "push" refers to transmission from a sender to a recipient. Pushing may be especially useful for situations where a user device has not previously had opportunity to propagate requests for fog networking opportunities e.g., short notice, etc. The pushed routine rules and/or routine triggers may be accepted or declined based on e.g., user preferences, network considerations, device capabilities, priority, default settings, and/or other factors. In some embodiments, the routine rules and/or routine triggers are assumed to be accepted by the recipient. In other embodiments, sender will not assume that the recipient has accepted the rules or trigger unless it also receives a confirmatory acceptance or denial.

In one exemplary embodiment, the routine rules and/or routine triggers are "pulled" from other devices. As used herein, the term "pull" refers to active requests to other devices for any routine rules and/or triggers. Pulling may be especially helpful where a user would like to proactively participate in fog networking for e.g., monetary compensation or other forms of incentivization. As with push notifications, pulled routine rules and/or routine triggers may always be accepted, or may be accepted/declined based on e.g., user preferences, network considerations, device capabilities, priority, default settings, and/or other factors.

Certain aspects of user routine may be sensitive and/or give rise to privacy considerations. For example, the mere generation, acceptance and/or denial of a routine rule or routine trigger may impart sensitive information to others; e.g., requesting services at a specified location and time may provide a general timeline of both the requesting and answering device's expected activity. Consequently, user routine data, routine rules, and routine triggers may be propagated over secure and/or anonymized connections for various exemplary implementations. Common examples of such safeguards may include e.g., encryption/decryption, anonymization, scrambling, steganography, and/or any number of other data obfuscation techniques. For example, a user that stores content for another user to retrieve may not know e.g., who the other user is, what the content is, and/or when (or even if) the content is retrieved by the other user. Similarly, a user may anonymize and/or obscure his requests for fog networking service by e.g., providing a multitude of unrelated requests and/or requesting with temporary anonymized identification.

In one embodiment, the routine rules and/or routine triggers may be propagated to multiple devices any one of which can satisfy the request. In some cases, more devices than are necessary to fulfill the request will accept the routine rules and/or routine triggers. As previously noted oversubscription may be used to offset the various uncertainties of fog networking opportunities; additionally however, oversubscription may also be used as an obfuscation technique. In other words, certain embodiments of the present disclosure may propagate routine triggers and routine triggers to more devices in a manner that disguises the underlying user routine. Such obfuscation may vary details such as e.g., time, location, nature of fog network, etc.

In one exemplary embodiment, the requestor may be notified that the request was propagated. For some applications, mere propagation may be sufficient e.g., it may be relatively unimportant whether or not the request was accepted. For example, a device may cache certain types of content and publish the routine triggers and/or routine rules necessary for another device to request the content later; device operation may not be substantially impacted whether or not the content is later requested.

In other embodiments, the requestor may require assurances that a request was accepted. In some variants, oversubscribed requests may require multiple acceptances up to a threshold amount, before determining whether or not the oversubscribed request is likely to succeed. Once the requestor has sufficient assurances that a request was accepted, the requestor can set aside, allocate, and/or otherwise plan for the fog networking event. As a related embodiment, the requestor may be notified when a request is denied (or where insufficient responses were received). A requestor that is notified that a request has been denied can plan accordingly and/or even re-submit with adjustments (e.g., larger incentives, different scope of location and/or time, etc.).

In one embodiment, the routine rules and/or conditional routine triggers may be associated with a priority value. Priority values may be assessed according to a common absolute scale or according to a relative or otherwise subjective scale. In one such example of an absolute priority scheme, a centralized network entity may select a priority value within a range (e.g., 1 to 3, 3 being the highest priority). The absolute scale ensures that the centralized network can control how certain routine triggers and/or routine rules are prioritized. In a different example, incentivization schemes may be based on a relative scale. In one such example, the routine trigger and/or routine rule may be associated with a monetary bounty. Some users may be enticed by the bounty, whereas other users may not view the bounty as sufficient incentive to offset the costs of participation.

The foregoing discussions are purely illustrative. Still other permutations and/or variants for identifying fog networking opportunities based on routine data will be readily appreciated by artisans of ordinary skill given the contents of the present disclosure.

Methods for Creating a Fog Network Based on Routine Triggers—

For practical reasons, it is inefficient to reserve precious network resources (e.g., timeslots, frequency bands, bandwidth, processing power, memory storage, etc.) for long periods of time ahead of time. Similarly, tracking future allocations of network resources for all the possible fog networks that may or may not materialize is a logistical nightmare. Contention based access to resources (and/or "best effort" type arbitration) can also suffer inefficient network resource utilization. As a result, existing techniques for fog networking generally resolve authentication, authorization, network resource arbitration and/or negotiation when the fog network materializes.

As noted supra, fog networking opportunities can be identified, in some cases, very far in advance (hours or even days) from when the fog networking opportunity will arise based on user routine data. However, various embodiments of the present disclosure can also dynamically request and/or allocate precious network resources on an as-needed basis much closer to the fog networking opportunity without the aforementioned reservation and/or logistical complexities. In particular, network resources may be reserved/allocated when a routine trigger fires that is indicative of an increased likelihood of a fog networking opportunity. More directly, the staged process of identifying fog networking opportunities separately from creating a fog network, ensures that non-time sensitive network participation is decoupled from time sensitive network resource management.

While a two-stage process (e.g., identify fog networking opportunity, create fog network) is generally described herein, artisans of ordinary skill in the related art will readily appreciate that the various concepts can be extended to layer multiple stages of routine triggers and routine rules. Various embodiments described hereinafter may layer tiers of routine trigger/routine rule execution to provide more granularity for network resource management (e.g., to reserve and/or allocate network resources with increasing levels of specificity commensurate with the likelihood of a fog networking opportunity.) Specifically, a routine trigger that indicates that a fog networking opportunity is more likely to occur (but is not yet imminent), may cause execution of routine rules that take some (but not all) steps toward reserving/allocating network resources necessary for the fog network.

As one such example, a user device may configure a shorter transmission time interval (TTI) and/or complete preliminary security credentialing (e.g., authentication, authorization, accounting, etc.) in preparation for an impending fog network opportunity (but stop short of requesting time slots or frequency band allocations). If the fog network opportunity materializes, then these steps reduce the instantaneous network burden for fog network creation (only the remaining network resource requests need to be handled). If the fog network opportunity does not materialize, then the user device can revert back to a larger TTI and remove the security credentials with minimal network overhead.

Referring now to FIG. 5, one logical flow diagram of an exemplary method 500 for creating a fog network based on routine triggers is presented.

At steps 502 of the method 500, one or more devices transact control plane data in response to a routine trigger event. In some embodiments, transacted control plane data is additionally verified (step 504 of the method 500). However, not all control plane data must be verified; some embodiments may not require authentication because e.g., the transacted data is unimportant and/or other security measures are present. More generally, the following discussions enable distributed control plane operation among the user devices. In one exemplary embodiment, the control plane data may be implicitly verified by virtue of interlocking and/or compatibility (e.g., the control plane data only enables operation with its interlocking complement, etc.). In other embodiments the control plane data may be explicitly self-authenticating (e.g., signed by a recognized trusted authority).

As previously noted, control plane data refers to layers of the protocol stack that carry signaling traffic used for network routing. Historically, control plane traffic originates from, or is destined for, a router or other network entity. However, various embodiments of the present disclosure may use control plane traffic that does not require access to any centralized network entity. In fact, various embodiments of the present disclosure may enable user devices to transact control plane data directly between one another. Additionally, while the present disclosure uses illustrative examples of control plane and data plane functionality presented within the context of 3GPP and/or IEEE, artisans of ordinary skill may substitute with equivalent success other forms of signaling and/or protocols for network routing and/or control.

In one exemplary embodiment of the present disclosure, the user devices may use a "ledger-based" control plane as discussed in co-owned and co-pending U.S. patent application Ser. No. 16/211,029, filed Dec. 5, 2018, and entitled "METHODS AND APPARATUS FOR INCENTIVIZING PARTICIPATION IN FOG NETWORKS", incorporated supra. The following discussions provide exemplary implementations of ledger-based control plane functionality in more detail.

Figure 6A:
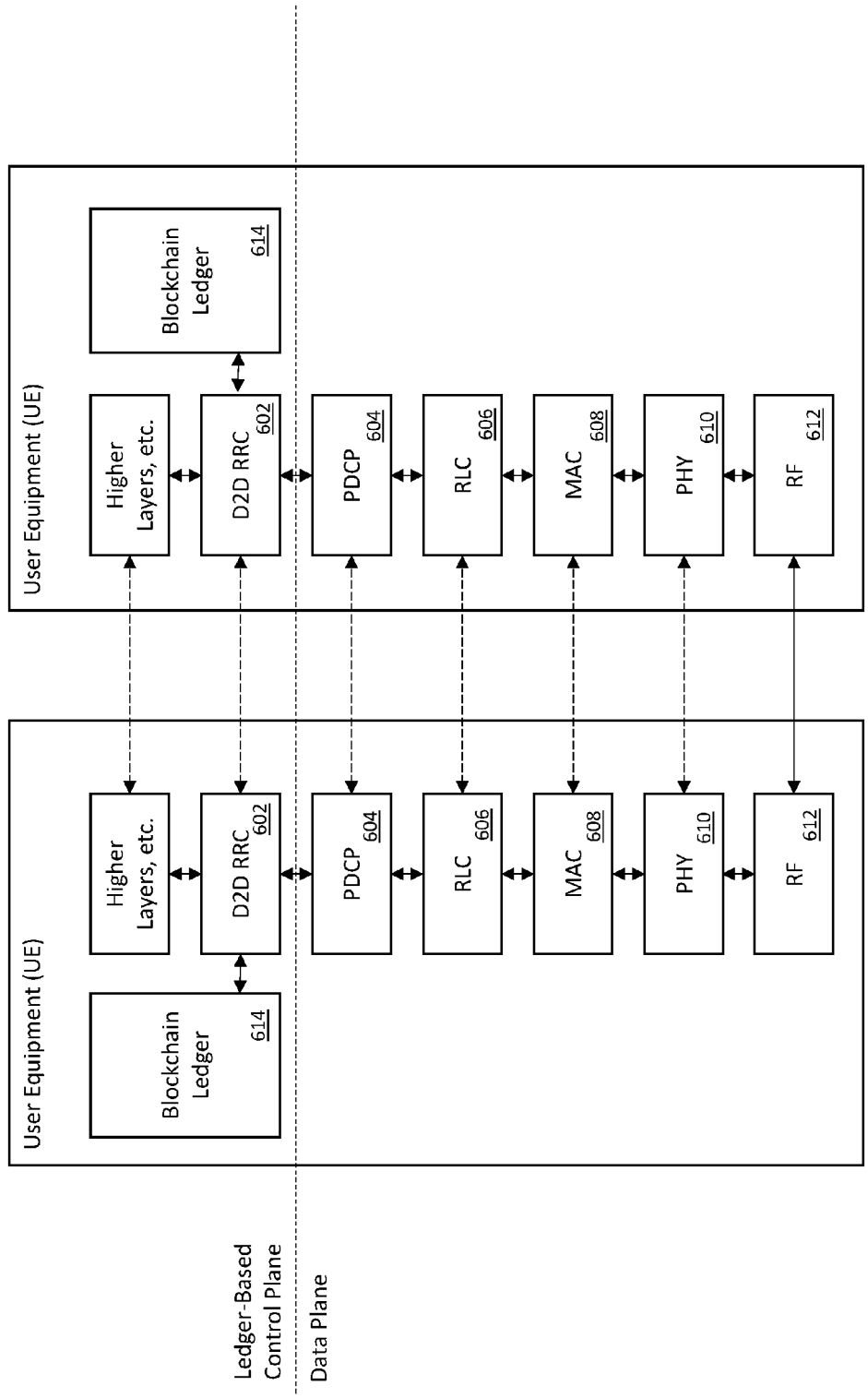
FIGS. 6A-6B are logical block diagrams of exemplary ledger-based control plane communication stack protocols, in accordance with the various principles described herein.

FIG. 6A is a logical block diagram of one exemplary device-to-device (D2D) 3GPP communication stack protocol 600. The exemplary device-to-device (D2D) 3GPP communication stack protocol 600 includes e.g., the Packet Data Convergence Protocol (PDCP) layer, the Radio Link Control (RLC) layer, the Medium Access Control (MAC) layer, and the Physical Layer (PHY). Since centralized network control layers may not be available e.g., the Radio Resource Control (RRC), various embodiments of the present disclosure further envision a device-to-device (D2D) RRC layer that relies on a blockchain ledger.

As a brief aside, the Radio Resource Control (RRC) layer is typically used to control connection status in 3GPP networks. Specifically, the major functions of the RRC protocol include connection establishment and release functions, broadcast of system information, radio bearer establishment, reconfiguration and release, RRC connection mobility procedures, paging notifications and some limited power control. The RRC protocol is used by the network to configure the user and control planes according to the network status so as to implement various Radio Resource Management strategies.

As shown therein, the 3GPP communication stack of one user equipment (UE) communicates with the communication stack of another UE using at least the following layers: the D2D RRC layer 602, the PDCP layer 604, the RLC layer 606, the MAC layer 608, the PHY layer 610, and the RF layer 612. Additionally, the D2D RRC layer 602 has access to a distributed ledger 614 of credits and/or debits. In the illustrated embodiment, the distributed ledger is locally stored; in other embodiments, the distributed ledger may be accessible e.g., via an external drive or other interface.

In one exemplary embodiment of the present disclosure, the D2D RRC layer 602 is configured to enable two or more devices to establish a radio resource control (RRC) connection between one another independently of the control plane. More directly, rather than relying on a gNB to allocate radio resources for devices via traditional RRC connections, mobile devices can flexibly share their frequency allocations to e.g., perform various fog networking functionality. When fog networks are sufficiently isolated from nearby cellular traffic, they can communicate via D2D underlays (leveraging frequency reuse in isolation to minimize network interference). Resource allocations can be tracked within the distributed ledger 614 thereby ensuring that the devices are appropriately credited/debited once the device rejoins cellular network provider coverage. Similarly, when the fog networks are connected in whole, or in part, with existing cellular networks they can aggregate and internally manage the resource allocations of their UEs. For example, the time and/or frequency resources of one UE can be used to augment another UEs resource allocations (with appropriate credits and debits).

In one exemplary embodiment, the D2D communication stack is distinct from the existing 3GPP communications stack (e.g., a 5G 3GPP communication stack). In other embodiments, the D2D communication stack is subsumed or otherwise integrated within the 3GPP communication stack. Integrated implementations may enable coexistence type operations and/or enable concurrent operation between e.g., a D2D communication stack and a 5G 3GPP stack. In one exemplary variant, the D2D RRC layer 602 is distinct from the RRC layer of existing 3GPP communications stacks. In other variants, the D2D RRC layer 602 is a portion of (or subsumed within) the RRC layers used for other communications (e.g., a D2D RRC subsumed within a 3GPP RRC layer).

The ledger-based control plane packets are interpreted by the D2D RRC layer 602 to control the connection status in a fog network and/or with a peer device. Specifically, the major functions of the D2D RRC protocol include, without limitation: reception of a data structure that identifies services and/or capabilities of the fog network connection, fog network connection establishment and release functions, and paging notifications from other devices.

The PDCP layer 604 controls lower layers (e.g., the RLC layer 606, etc.) to send and receive data. The PDCP layer 604 packs and unpacks data into/out-of PDCP data packets that are transacted with the D2D RRC layer 602. The PDCP packets may include a variety of information and/or include data plane packets, control plane packets, etc. In the exemplary embodiment, the PDCP packets may include ledger-based control plane packets. The D2D RRC layer 602 may discover the presence of a nearby peer device and/or a fog network via notifications from the lower layers (e.g., PDCP 604). Additionally, the D2D RRC layer 602 may broadcast its own presence to nearby peer devices and/or a fog network via the lower layers. In some cases, the D2D RRC layer 602 may additionally perform authentication and/or authorization with the nearby peer entities; in other variants, no authentication and/or authorization process is performed.

The foregoing discussion of FIG. 6A is presented in the context of 3GPP cellular communications stack architectures. However, the various principles described therein maybe broadly applied to a variety of other technologies. For example, FIG. 6B illustrates an alternative implementation useful within IEEE communication stack architectures commonly used in e.g., IEEE 802.3 Ethernet, IEEE 802.11 Wi-Fi, and IEEE 802.16 WiMax technologies.

As a brief aside, the IEEE communication stack eschews the security and ciphering functionality of e.g., the 3GPP PDCP layer, relying instead on higher layer software agents for this functionality (if required at all). Similarly, the radio bearer management functionality provided by the 3GPP RLC handles radio link control; such functionality is subsumed by the technology specific IEEE MAC, etc. While the IEEE communication stack divides communication stack functionality differently than 3GPP communication stack, artisans of ordinary skill in the related arts will readily appreciate that many of the underlying capabilities and functionalities of the communications stack are present in both technologies.

Figure 6B:
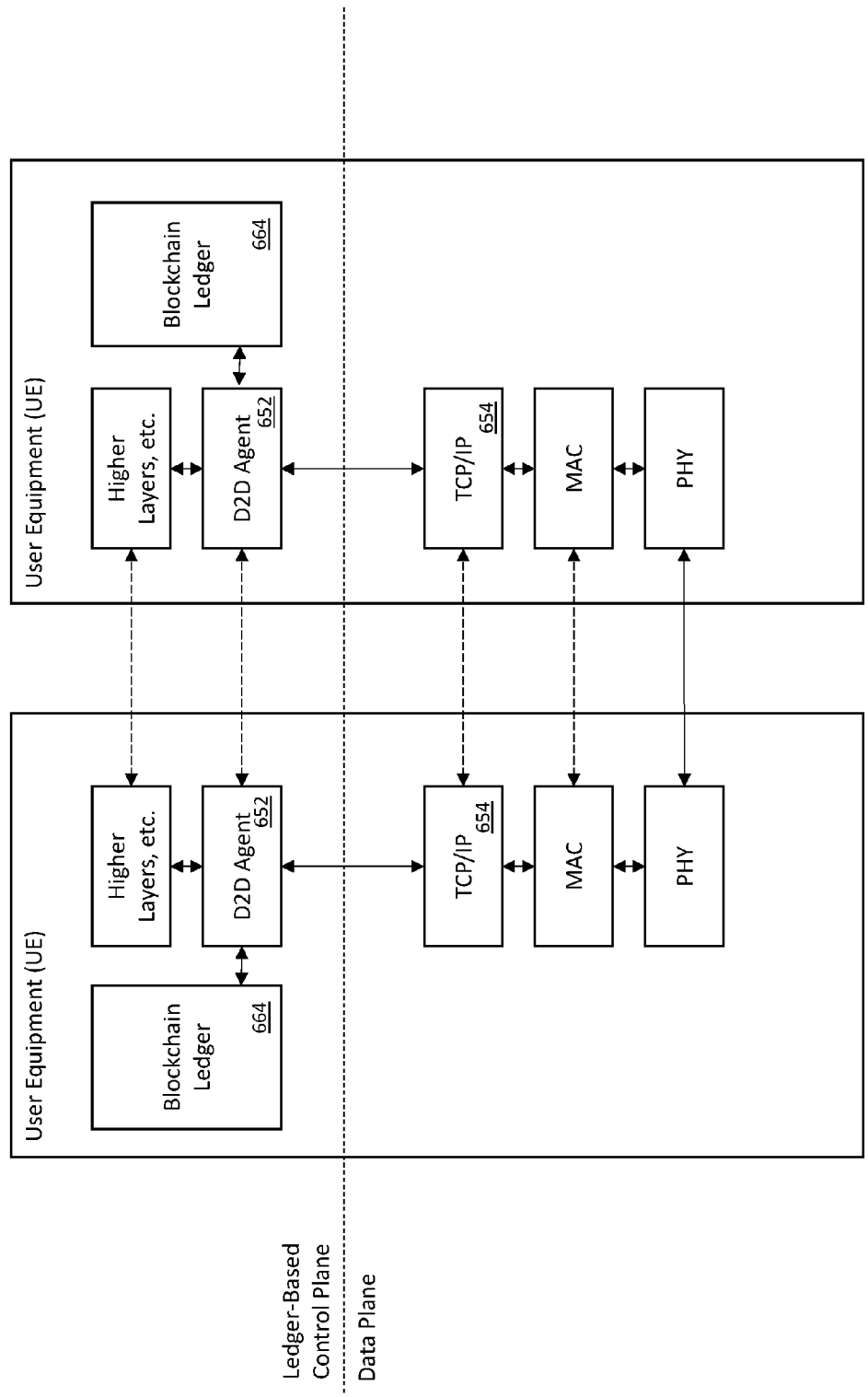

As shown in FIG. 6B, the communication stack includes: the D2D Agent layer 652, the TCP/IP layer 654, the MAC layer, and the PHY layer. Additionally, the D2D Agent layer 652 has access to a distributed ledger 664.

In one exemplary embodiment, the D2D agent layer 652 can be implemented as a software agent over existing IEEE communication stack. Unlike the foregoing 3GPP communication stack of FIG. 6A, the IEEE communication stacks assume some degree of contention based access, and are not subject to the same resource planning and allocation issues as is commonly used within 3GPP networks.

As shown therein, the TCP/IP layer 654 controls lower layers to send and receive data using TCP/IP packets. The TCP/IP layer 654 packs and unpacks data into/out-of TCP/IP and presents the data in buffers associated with a "network socket" for the D2D Agent 652. The D2D Agent 652 can read and write data without any consideration of the underlying networking technology (e.g., IEEE 802.3, IEEE 802.11, IEEE 802.16, etc.) In one exemplary embodiment, the D2D Agent layer 652 may include ledger-based control plane data to open and/or transact data through, or on behalf of, a peer device.

Still other communications stack architectures may be substituted with equivalent success by artisans of ordinary skill in the related arts. For example, other networking technologies may provide higher level connectivity (e.g., via secure tunneling at higher layer software) or even lower level connectivity (e.g., via MAC and/or data link layer signaling such as Ethernet frames). In fact, blockchain technologies are inherently error-tolerant and could be modified to operate even with very low reliability connections; for example, a device may re-submit failed transactions, corrupted transactions and/or transactions that were never received.

In another exemplary embodiment of the present disclosure, the user devices may use a "time-shifted" control plane. Within the context of control plane data, the term "time-shifted" refers to control plane data that is constrained for later use. Common examples of constraints include without limitation e.g., future schedules, windows of time, scheduled time(s), nonces (a one-time use data structure), and/or other forms of temporal constraint. Examples of time-shifted control plane data may include e.g., authentication and/or authorization nonces, resource allocations (time slots, frequency bands, spreading codes, etc.), temporary identifiers (e.g., for anonymization), etc.

Figure 7A:
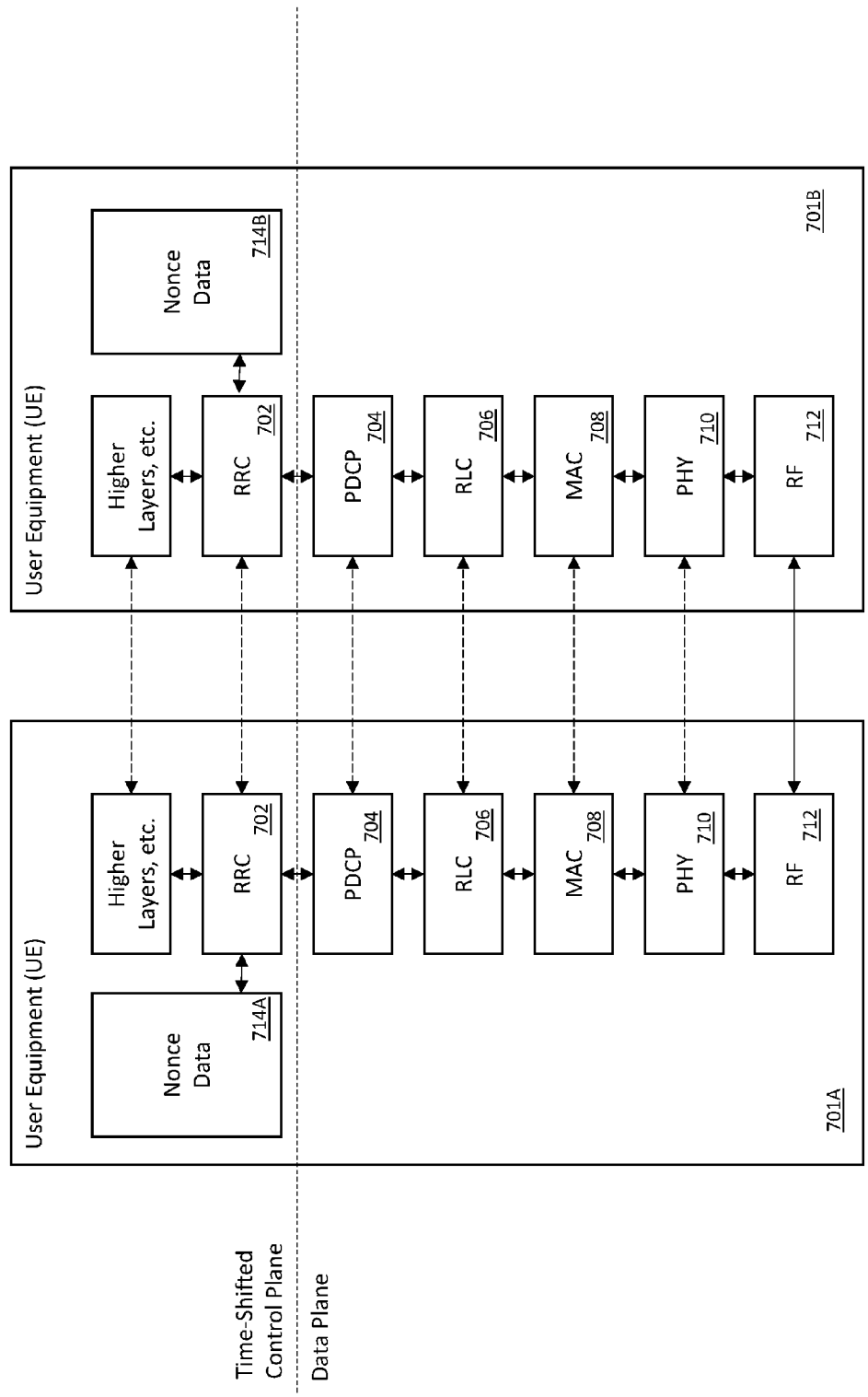
FIGS. 7A-7B are logical block diagrams of exemplary time-shifted control plane communication stack protocols, in accordance with the various principles described herein.

FIG. 7A is a logical block diagram of one exemplary device-to-device (D2D) 3GPP communication stack protocol 700. As shown therein, the 3GPP communication stack of one user equipment (UE) communicates with the communication stack of another UE using at least the following layers: the RRC layer 702, the PDCP layer 704, the RLC layer 706, the MAC layer 708, the PHY layer 710, and the RF layer 712.

As previously noted with respect to FIGS. 6A and 6B, the centralized network control layers may not be available e.g., the Radio Resource Control (RRC). However, unlike the aforementioned ledger-based control plane, various embodiments of the present disclosure pre-seed time-shifted control plane data in the peer devices. In other words, the UE 701A has a local memory 714A that stores RRC data for UE 701B; similarly, UE 701B has a local memory 714B that stores RRC data for UE 701A.

During exemplary time-shifted operation, rather than performing the 3GPP Authentication and Key Agreement (AKA) protocol with a gNB, the challenge-response transaction is performed as a handshake between the UEs themselves, using locally stored nonce RRC data within the corresponding peer device. In other words, UE 701A must correctly respond to authentication challenges that are posed by UE 701B and/or UE 701B must correctly respond to authentication challenges that are posed by UE 701A.

In one exemplary embodiment, the Authentication and Key Agreement (AKA) protocol data includes nonce (number used once) authentication quintets that may include e.g., an IMSI or TMSI (International or Temporary Mobile Subscriber Identifier), AUTN (authentication token), RAND (random number), XRES (expected response), CK (cipher key), and IK (integrity key). For privacy and security reasons, the AKA information is only generated ahead of time by a secure entity (e.g., the network provider's home location register (HLR), visiting location register (VLR), or similar entity), and stored locally in the corresponding peer UE's Nonce RRC data memory 714.

In one exemplary embodiment, the time-shifted AKA exchange may be performed as follows: a first UE 701A provides its IMSI or TMSI to a second UE 701B. In response, the second UE 701B retrieves an AUTN and RAND that is transmitted back to the first UE 701A. The first UE 701A generates a response (RES) that is provided back to the second UE 701B. The second UE 701B compares the RES to the XRES. If the two values match, then the challenge has been correctly answered and the cipher key (CK) and integrity key (IK) can be sent. The handshake can be one-way (the first UE authentications the second UE), two-way (the first and second UE authenticate each other), or multi-way (e.g., multiple UEs authenticate each other).

Notably, each UE 701 does not have access to the information necessary to generate new authentication quintets, and each authentication quintet is only usable once (they cannot be replayed). Additionally, for privacy and security reasons, each UE may be "padded" with a very large number of false AKA authentication quintets. In fact, some of the false AKA authentication quintet information may be "dye-packed" such that if a malicious UE attempts to use a dye-packed authentication quintet to access the network, then the malicious UE can be flagged and/or disabled.

More generally, any number of other techniques for encrypting, enforcing, and/or obfuscating control plane transactions to protect user identity may be used. In some variants, the privacy protections may be specific to a user (e.g., asymmetric encryption, public/private encryption, and/or various other user or device based security measures.) In other variants, the privacy protections may change as a function of e.g., time, location, content, and/or any number of other variants. Rotating or time changing encryption, geo-fence based security, and/or content based encryptions may be substituted with equivalent success.

Artisans of ordinary skill in the related arts will readily appreciate that the time-shifted control plane operation is very similar to existing 3GPP control plane operations. Thus, in one exemplary embodiment, the time-shifted communication stack is subsumed or otherwise integrated within the 3GPP communication stack (e.g., a 5G 3GPP communication stack). Alternatively, the communication stack may be distinct from the existing 3GPP communications stack.

Figure 7B:
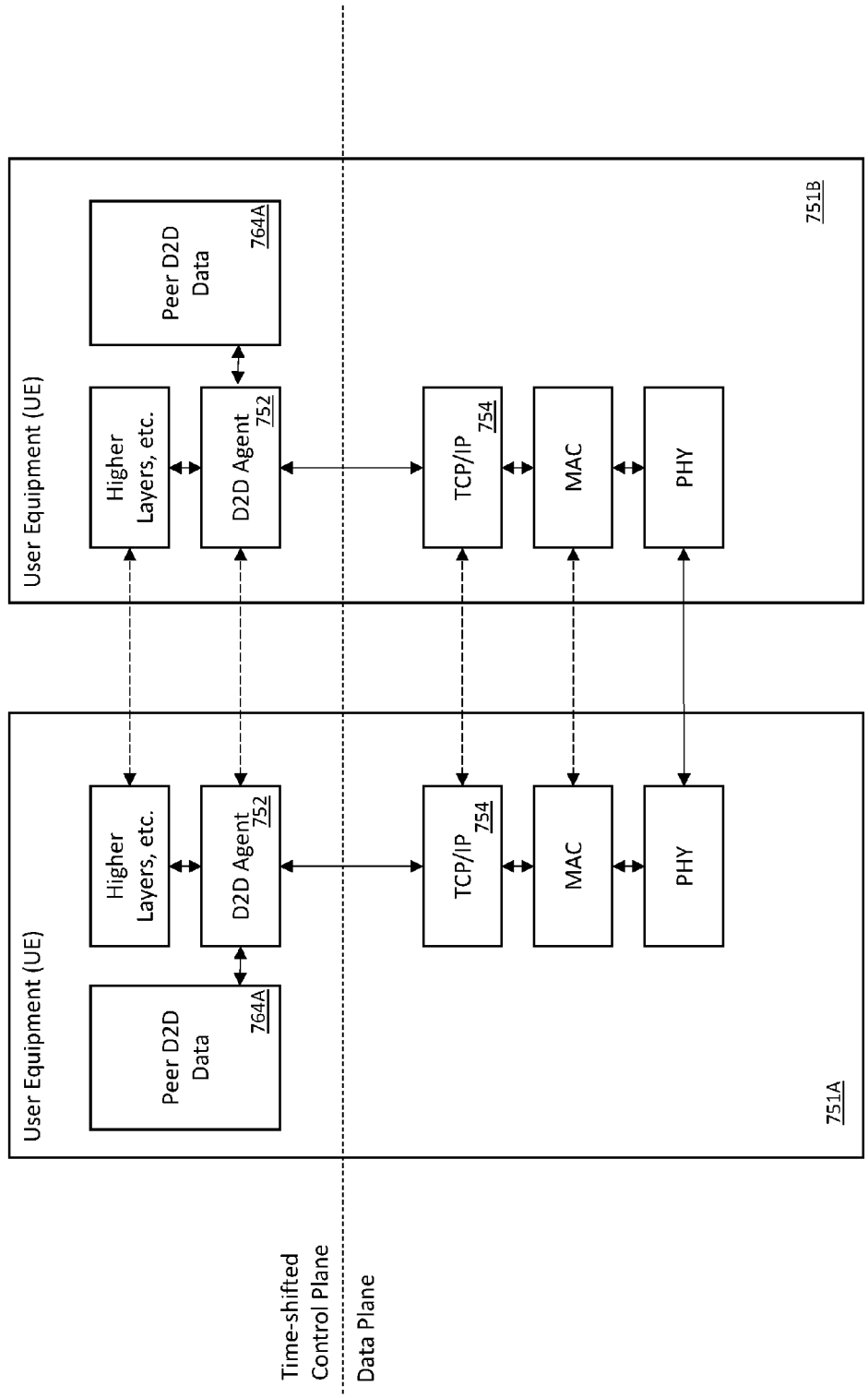

FIG. 7B illustrates an alternative time-shifted implementation useful within IEEE communication stack architectures commonly used in e.g., IEEE 802.3 Ethernet, IEEE 802.11 Wi-Fi, and IEEE 802.16 WiMax technologies.

As shown therein, the communication stack includes: the D2D Agent layer 752, the TCP/IP layer 754, the MAC layer, the PHY layer. Additionally, the D2D Agent layer 752 has access to a peer D2D data 764A that is associated with other UEs.

In one exemplary embodiment, the D2D agent layer 752 can be implemented as a software agent over existing IEEE communication stack. During exemplary operation, UE 751A must correctly respond to authentication challenges that are posed by UE 751B and/or UE 751B must correctly respond to authentication challenges that are posed by UE 751A. Artisans of ordinary skill in the related arts will readily appreciate the wide variety of different authentication and/or authorization schemes that proliferate within the IEEE ecosystem (e.g., broadly covered within e.g., IEEE 802.1X, EAP, EAPOL, etc.).

Other communications stack architectures maybe substituted with equivalent success by artisans of ordinary skill in the related arts. For example, other networking technologies may provide higher level connectivity (e.g., via secure tunneling at higher layer software) or even lower level connectivity (e.g., via MAC and/or data link layer signaling such as Ethernet frames).

While the foregoing discussions of FIGS. 6A, 6B, 7A, and 7B enable operation without access to a centralized networking entity, artisans of ordinary skill in the related arts will readily appreciate that the various techniques described herein may leverage and/or interoperate with existing networking infrastructure where present. In one exemplary embodiment, the various devices access the core network via a gNB (or similar serving entity) and/or may operate within fog networks. Under such embodiments, the user devices can connect to the gNB and/or core network via 3GPP radio resource control (RRC) procedures to e.g., authenticate and/or obtain network resources. Still other embodiments of the present disclosure may use any combination or hybridization of e.g., existing control plane transactions, ledger-based control plane transactions, time-shifted control plane transactions, or other forms of control plane transactions.

Under some circumstances, a fog network may be a complete "island" i.e., the fog network may be isolated from all other nearby networks due to e.g., radio frequency use and/or time or spatial separation. For example, certain rural areas and/or low-earth orbit/outer space communications may sufficiently isolated. In such cases, various user devices may be free to negotiate amongst themselves for resources. More directly, user devices may negotiate time slot, frequency bands, and/or spreading code assignments. Other control plane techniques for requesting, assigning, and/or contending for network resources from a pool of common resources are readily appreciated by artisans of ordinary skill in the related arts.

Referring back to FIG. 5, the one or more devices establish a connection via the control plane data (step 506 of the method 500). In one exemplary embodiment, the connections may create a fog network that does not rely on base stations for communication e.g., the connections may be device-to-device (D2D) connections. In one exemplary embodiment, the fog network may be organized in a "cluster head" configuration or an ad hoc network (such as described in Fog Networks and Edge Device Participation supra). Still other network configurations may be substituted with equivalent success. Common examples of such networking topologies may include e.g., ring, mesh, star, fully connected, daisy chain, tree, and/or bus network.

As previously alluded to, existing 3GPP networks were designed around the cellular network paradigm and have always assumed that a UE would communicate with other logical entities via control plane routing controlled by a base station, wireless access point, etc. In contrast, the various fog networks described herein may be dynamically organized as a loose coalition of user devices in D2D networks of varying complexity. In other words, unlike cellular network planning that is constrained to specific trade-offs, the exemplary D2D fog networks of the present disclosure can be configured in a variety of different ways so as to e.g., maximize geographic coverage, minimize latency, maximize throughput, and/or securely route data based on localized networking considerations.

As a brief aside, D2D fog networks may use a variety of different credit/debit schemes so as to emphasize or de-emphasize different aspects of fog network functionality. Various incentivization schemes are described in e.g., co-owned and co-pending U.S. patent application Ser. No. 16/211,029, filed Dec. 5, 2018, and entitled "METHODS AND APPARATUS FOR INCENTIVIZING PARTICIPATION IN FOG NETWORKS", incorporated supra. For instance, when demand for participation of devices is higher, the amount of tokens earned or required for services may also be higher ("surge pricing") and vice versa. Credit may increase or decrease also in response to whether the requested client device is in demand, how much charge remains in a client device (e.g., depending on a threshold battery level), rate of charging, whether the client device has a stable power source (e.g., plugged into an outlet), density of client devices in an area, position or mobility of the client device, hardware or software capabilities of the client device (e.g., memory capacity, processor, number of antennas, OS type and version), efficiency of radio antennas, distance from other client devices or nodes, availability of alternate communication links (e.g., WLAN connectivity for uploading to remote storage), bandwidth overhead and usage by a client device, criticality or popularity of the data, whether the client device is a subscriber to the network service provider, any state of alert (e.g., presence of natural disaster, AMBER Alert™), etc. In some embodiments, users may also set their own bidding and asking prices.

In the exemplary embodiment, this credit is redeemable for various services (e.g., from the network service provider) or device functionality from other users of the network. For example, the client device may request upload services by another client device in exchange for a certain amount of tokens (as established by the other client device or a going market rate), where the first client device may neither have sufficient cellular data transfer (e.g., via 4G LTE) allotment from its service provider nor other means of transferring data (e.g., not near a WLAN access point) but the second client device does. In fact, if the second client device has unlimited available bandwidth, the second client device may specialize in data transfers. In one variant, the device may set a preference (e.g., via a downloadable mobile application from the network service provider) to automatically accept service requests from other client devices. In another variant, the device may choose to accept a request from, e.g., a list or chart of available requests, akin to a list of bounties. In some implementations, a user of the device may sort available requests by bounty, type of work requested, type and capabilities of the device (e.g., manufacturer, data rate), reputation of the requesting user (as rated by, e.g., other users of the network), etc.

Figure 8:
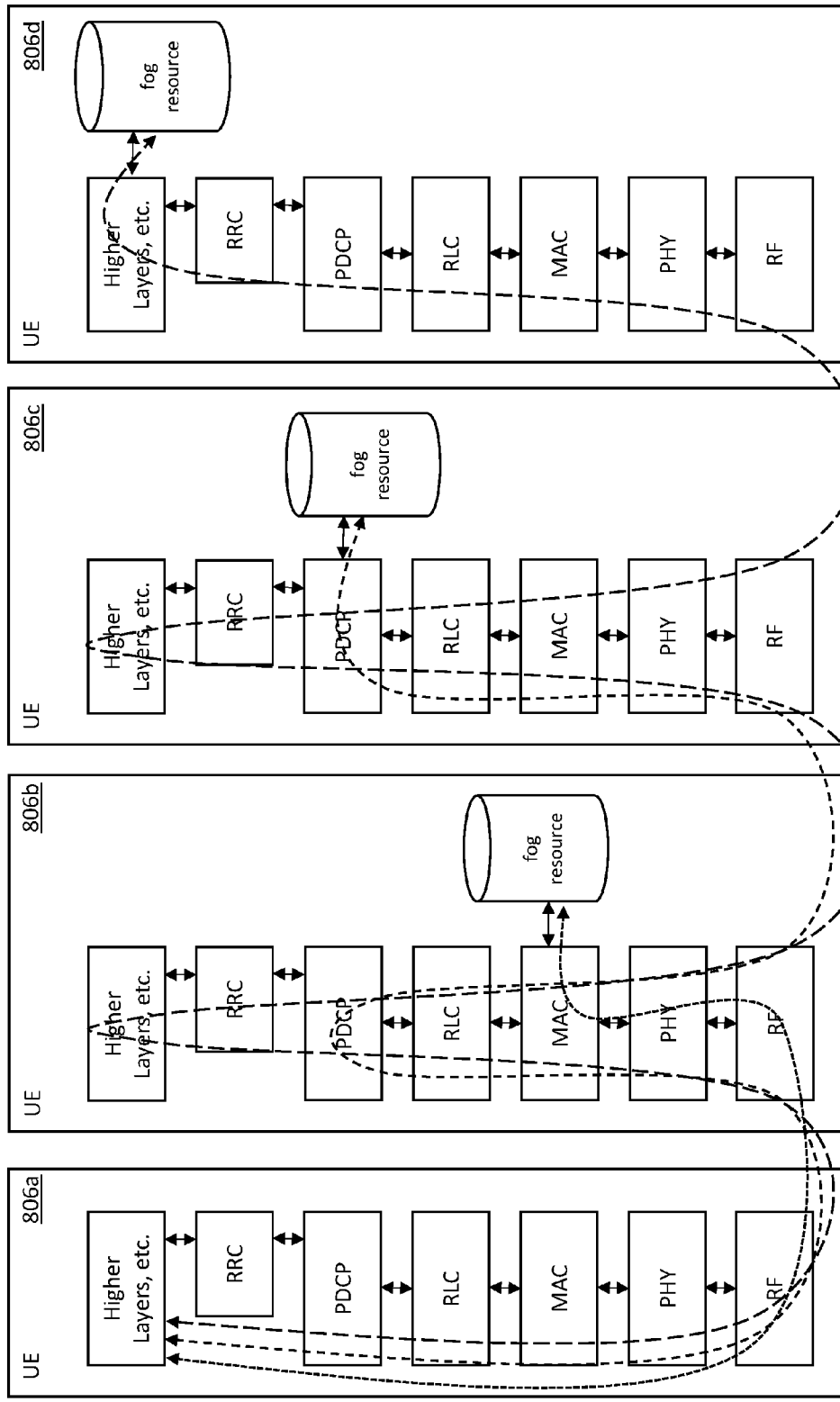
FIG. 8 is a logical block diagram of a variety of different communication links, in accordance with the various principles described herein.

FIG. 8 is a logical representation of the variety of different communication links enabled by the various embodiments of the present disclosure. As shown therein, a UE 806a can: (i) access resources at a directly connected UE 806b, (ii) access resources at an indirectly connected UE 806c (via hop-based routing), and/or (iii) access resources at a UE 806*d* (or gNB and/or the broader Internet) via higher layer protocol signaling.

Consider the direct connection between the first UE 806*a* and the second UE 806*b*. Direct connectivity between the UEs can be performed with so-called "layer 2" (L2) routing. Common examples of L2 routing technologies include e.g., ITU-T G.8032, Ethernet Ring Protection Switching (ERPS), Multiprotocol Label Switching (MPLS), etc. L2 routing technologies only require medium access control (MAC) addresses to enable data transfer between two devices within a fog network. UE 806*a* records the MAC addresses of devices that have been discovered in its immediate vicinity. Layer 2 routing is very simple (and by extension much faster than higher complexity routing), thus UE 806*a* can access (read/write) fog resources at UE 806*b* very quickly.

Traditionally, only devices within the immediate vicinity could recognize MAC addresses (devices outside of the immediate fog network did not recognize MAC addresses of other fog networks.) As a result, L2 routing had limited utility because UE 806*b* might be inaccessible when it left UE 806*a*'s immediate vicinity. In contrast, various embodiments of the present disclosure are substantially less affected by the "immediate vicinity" limitations of prior L2 routing. In one exemplary embodiment, the immediate vicinity may encompass devices that are within physical range of a device, and also any devices that will be in the physical range of a device in view of the routine data. More directly, as long as the device remains within the user routine, the device may route data via L2 routing (which can be much faster than traditional L3 based routing).

For example, in one such scenario, a car enters a highway ramp on a work commute. Once the car enters the traffic flow, it may be incorporated into a chain of nodes using L2 based routing (from car to car). Notably, such operation is not possible without user routine data since cars traveling in uncoordinated directions would quickly exit the immediate vicinity. In contrast, various embodiments of the present disclosure can coordinate an L2 network to only include cars moving in the same direction (with roughly commensurate speeds). Each node performs MAC layer routing to its immediate neighbors; in some cases, the cars may be configured to operate as a L2 backhaul (e.g., ring or daisy chain) that service Local Area Networks (LAN) or L3 type routing within the cars. In fact, the aforementioned L2 ring/daisy chain networking topology is commonly used in cellular network backhauls. Since car modems are also not power constrained (due to the wealth of electricity available via the onboard power system), each car that is a part of the L2 chain can provide connectivity and data rates to its passengers that is commensurate to e.g., a base station/femtocell.

Referring back to FIG. 8, so-called "layer 3" (L3) routing can support "hop-based" connectivity. For example, as shown therein first UE 806*a* can indirectly communicate with the third UE 806*c* via L3 routing. L3 routing requires logical network addressing and subnet control; each L3 node checks the source and destination logical addresses of every packet in its logical network routing table, and determines the best next hop for the packet (to a router, or to a switch). If no destination logical network address is found in the table, it will drop the packet unless it has a default router. L3 routing is very flexible but can introduce some latency; L3 routing provides very wide addressable ranges and by extension a much wider ecosystem of data and/or network resources. The illustrated L3 technology is the packet data convergence protocol (PDCP); however, a variety of other L3 routing technologies can be substituted with equivalent success. Common examples of L3 routing technologies include e.g., Transmission Control Protocol/Internet Protocol (TCP/IP), User Datagram Protocol/Internet Protocol (UDP/IP), etc.

Artisans of ordinary skill in the related arts will readily appreciate that L3 based routing can support a variety of different applications (e.g., TCP/IP is virtually ubiquitous and accounts for the vast majority of Internet content), however advances in processing, network bandwidth, and/or memory ubiquity have enabled new techniques and/or applications. Many of these applications may include e.g., virtual private networks (VPN), end-to-end encryption, remote driver operation, distributed resource allocation, data encapsulation, and/or other exotic resource management techniques which may be handled with higher layer application agents. Such higher order applications can be handled with equivalent success, as is shown in higher layer routing between UE 806*a* and UE 806*d*.

More generally, different networking topologies are characterized by different levels of routing complexity and/or functionality. The examples presented within FIG. 8 are purely illustrative, and artisans of ordinary skill in the related arts may substitute other forms of routing therein with equivalent success given the contents herein.

Referring back to FIG. 5, at step 508 of the method 500, the routine rule can be executed via the established connection. In one exemplary embodiment, the routine rule includes receiving data, providing data for computational analysis, and/or receiving network connectivity. In another exemplary embodiment, the routine rule includes transferring data, providing computational power, and/or providing network connectivity.

In some variants, pre-seeded data and/or resources may be processed, transferred, downloaded, stored, and/or pre-seeded for the device and/or another device. In some such variants, the pre-seeded data and/or resources may additionally be encrypted, allocated, and/or reserved for other devices. In other variants, the pre-seeded data and/or resources may be consumed either immediately or otherwise stored for subsequent access.

The foregoing discussions are purely illustrative. Still other permutations and/or variants for identifying fog networking opportunities based on routine data will be readily appreciated by artisans of ordinary skill given the contents of the present disclosure.

Example Operation—

Figure 9:
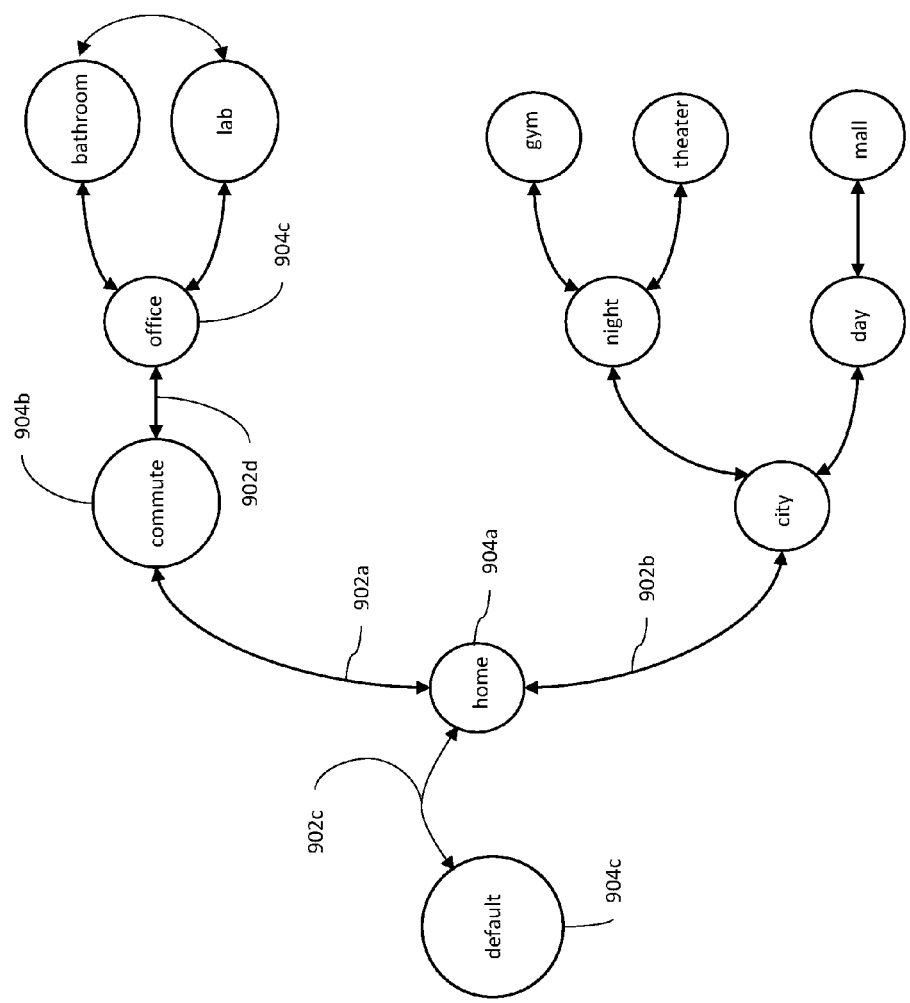
FIG. 9 is a logical state machine representation of a user's activity based on collected user routine data, in accordance with various aspects of the present disclosure.

FIG. 9 illustrates one logical state machine representation of a user's activity based on collected user routine data. In the illustrated embodiment, the user routine data is passively and/or actively collected during use of the user device. Historic user routine data is analyzed to identify routine triggers 902 (e.g., 902*a*, 902*b*, 902*c*, 902*d*, etc.) and routine rules 904 (e.g., 904*a*, 904*b*, 904*c*, etc.). For ease of illustration, the user's routine is represented as a finite state machine where each of the transitions between states are triggered by routine triggers 902 and each of the states correspond to routine rules 904 that configure fog network operation during the state. Artisans of ordinary skill in the related arts will readily appreciate that other methods for representing user activity may be substituted with equivalent success.

In the exemplary embodiment, each routine trigger 902 corresponds to a specific observable event that indicates a likely future activity. In the exemplary embodiment, the routine triggers 902 are based on e.g., a device accelerometer and/or geospatial coordinates that are monitored by the user's device. Common examples of routine triggers 902 may include e.g., turning onto the freeway, walking down the street, etc. When the user device detects a routine trigger, it transitions from its current state to the next state corresponding to the routine trigger.

In the exemplary embodiment, each routine rule 904 provides any fog networking information and/or fog networking tasks that are associated with the likely future activity. In the exemplary embodiment, the routine rules 904 may e.g., identify other peer devices that are nearby for fog network participation, identify content to be pre-seeded for others, and/or identify content that has been pre-seeded for the user device. In addition to routine rules 904, security information (e.g., authentication and key agreement (AKA) challenge and response transactions and/or keys) can also be pre-seeded out-of-band and/or in advance of the fog networking. For example, a user device can issue a challenge to another device purporting to be the expected fog network peer. If the other device provides the correct response behavior, then the other device is the expected fog network peer. The user device and the other device can transact encryption keys for a secure communication session.

Consider the "home" state associated with routine triggers 902a, 902b, 902c, and routine rule 904a. When the user is at home, the user device operates under a set of routine rules 904a corresponding to home device use. For example, the device may connect to a nearby base station and/or provide fog network connectivity for neighboring devices. However, based on user routine data analysis, the user tends to either take a commute to the office for work (as identified by routine trigger 902a) or head into the city for leisure (routine trigger 902b). Any activity that does not correspond to either of these routine triggers is handled as an unknown routine trigger 902c (the device defaults to legacy operation 904c).

In the "commute" state, the user device operates under a set of routine rules 904b corresponding to commuter use. For example, the device may form fog networks with nearby devices and/or provide fog network connectivity for neighboring devices. In one such exemplary embodiment, the device may use L2 based ring network routing to provide high speed backhaul access for its neighbors and/or L3 based hop routing for user data for other passengers and/or nearby users that are not part of the ring network. The "commute" state can either transition back to the "home" state, or transition to the "office" state (via routine trigger 902d).

In the "office" state, the user device operates under a set of routine rules 904c corresponding to office device use. For example, the device may connect to a nearby base station and/or provide fog network connectivity for neighboring devices.

Figure 10:
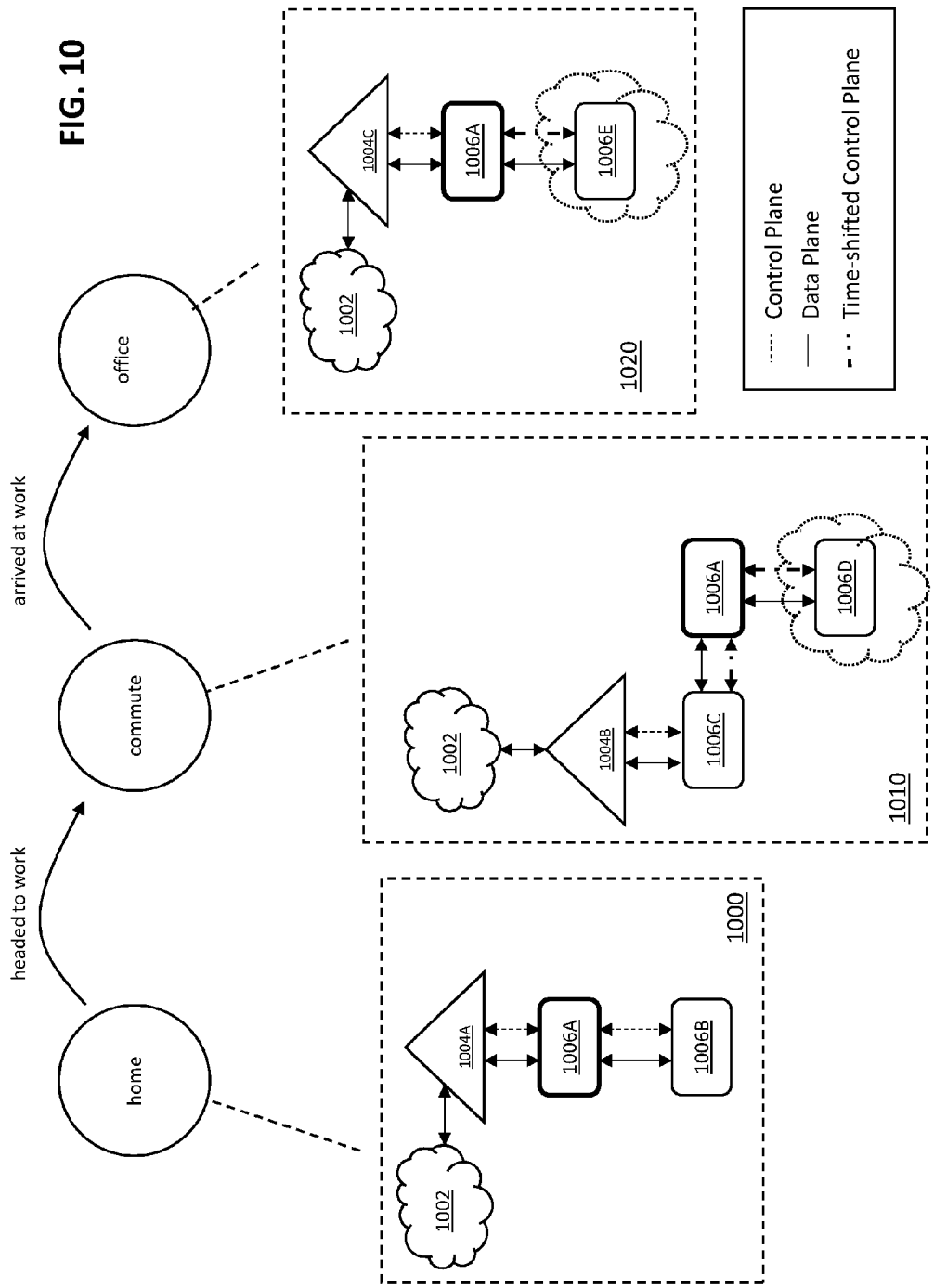
FIG. 10 is subset of the logical state machine representation of FIG. 9 further elaborated to illustrate various aspects of the present disclosure.

FIG. 10 is a logical representation a "daily commute to work" scenario. As shown therein, the user device 1006A is connected to a network operator's core network 1002 via a first gNB 1004A in the "home" state 1000. Additionally, the user device 1006A can participate in fog network with another user device 1006B. As illustrated in FIG. 10, the other user devices 1006B can only receive fog network services via control plane and data plane signaling with the core network 1002.

When the user leaves his house, his user device 1006A detects that he is headed to work and transitions into the "commute" state 1010. In the commute state 1010, the user device 1006A may be pre-seeded with information for his common commute activities. If the user needs to access the core network 1002, he can connect to a first user device 1006C via control plane and data plane signaling with the core network 1002. Alternatively, the user device 1006A may consume pre-seeded content with a second user device 1006D, based on time-shifted control plane data.

When the user exits the freeway, his user device 1006A detects that he has arrived at work and transitions into the "office" state 1020. In the office state 1020, the user device 1006A can access the core network 1002 for his normal operation. Additionally however, the user device may be able to offer time-shifted control plane based access for another user device 1006E for e.g., participation incentives (e.g., monetary rewards).

Exemplary Apparatus—

Figure 11:
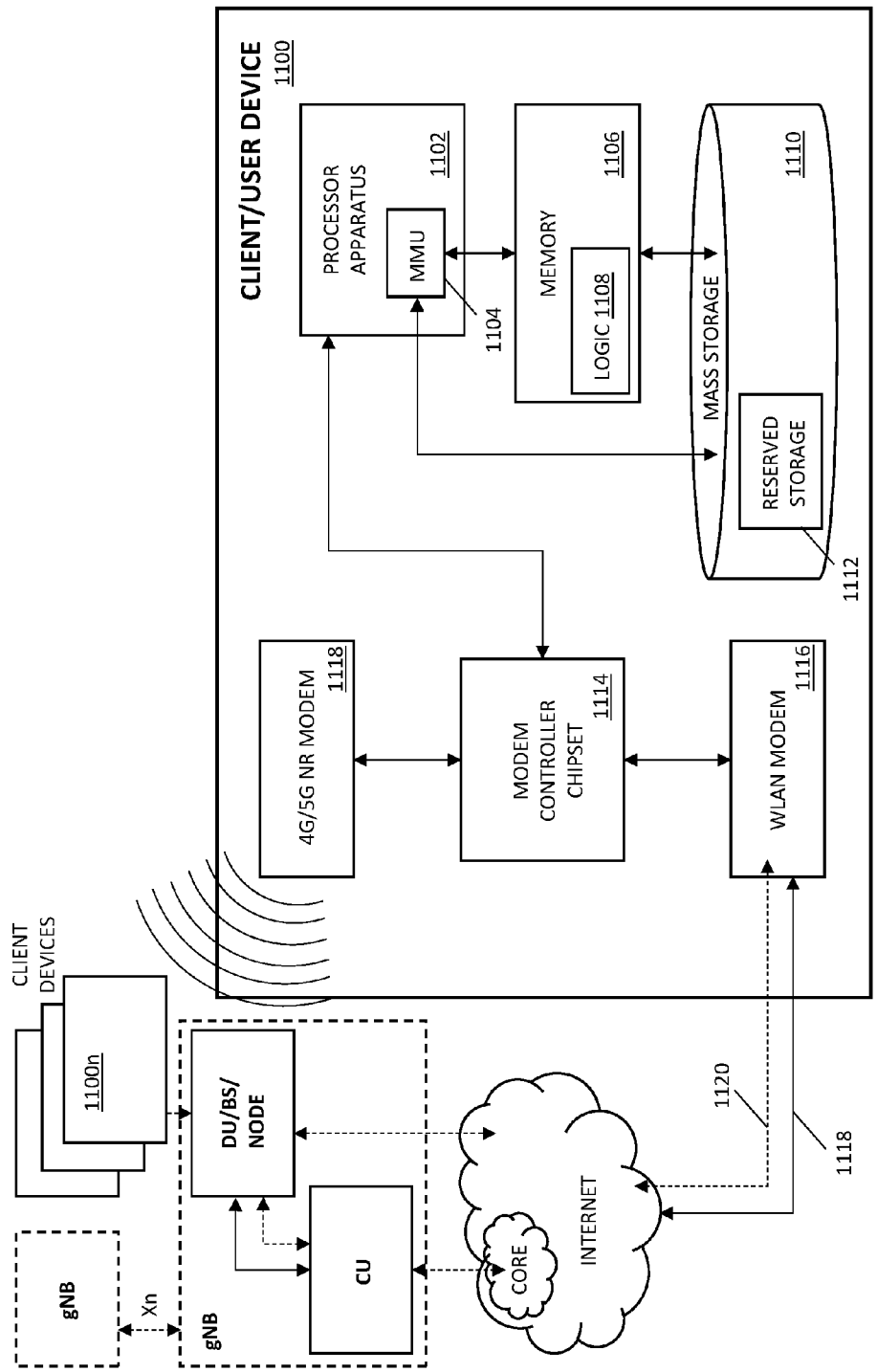
FIG. 11 is a logical block diagram of one exemplary client device, in accordance with various aspects of the present disclosure.

FIG. 11 illustrates a configuration of an exemplary client device 1100 according to the present disclosure.

In one exemplary embodiment as shown, the client device 1100 includes, inter alia, at least one processor apparatus or subsystem 1102, a memory management unit (MMU) 1104, a memory apparatus 1106 (e.g., DRAM) with program(s) or logic disposed 1108 thereon, a mass storage device 1110 (e.g., HDD, SSD, NAND flash) with at least one reserved portion 1112 (e.g., to provide temporary or permanent storage space other users or client devices in the network, separate from system files, reports, and the like for the operation of the client device).

In the exemplary embodiment, the processor may be in data communication with non-transitory computer-readable medium configured to store computer-readable instructions for execution. Storage media may be non-volatile memory (e.g., a flash memory) that is configured to store computer-readable instructions and/or other data, and retain the stored computer readable instructions without power. Such computer-readable instructions may alternatively or additionally be stored on a local cache associated with at least one of the processors.

Any process required by the client device may be executed by the processor apparatus 1102, dedicated hardware, and/or any other form of logic that performs logical operations. Examples of processing alternatives include, without limitation, reduced instruction set computer (RISC) processors, complex instruction set computing (CISC) processors, field-programmable gate arrays (FPGAs), application specific integrated circuits (ASICs), digital signal processors (DSP) and programmable logic devices (PLDs). The processor apparatus 1102 may run computer-executable instructions from logic 1108 or other programs stored in memory apparatus 1106 or mass storage device 1110. In one embodiment, the processor 1102 may also include an internal cache memory, and in one variant, is in data communication with a separate and dedicated MMU 1104 by which the processor apparatus accesses the logic and instructions residing on memory subsystem or device 1106. The memory subsystem may implement one or more of DMA-type hardware, so as to facilitate data accesses as is well known in the art. The memory device 1104 may contain computer-executable instructions and/or logic 1108 which are executable by the processor 1102 to implement data transactions, collection, storage, analysis, evaluation, management, etc. as described elsewhere herein. A processor may also be implemented as a combination of computing devices (e.g., a combination of a digital signal processor (DSP) and a microprocessor, multiple microprocessors, one or more microprocessors in conjunction with a DSP core, or any other such configuration).

The exemplary client/user device 1100 may further include a modem controller chipset 1114 (e.g., an independently operable processor apparatus or a standalone modem device). The modem chipset may be in data communication with a separate WLAN modem 1116 with interfaces communicable with a network and/or a separate 3GPP-capable RF device 1118 having, e.g., 3G, 4G, 5G, 4G/5G wireless antenna(s) and/or digitally controlled RF tuner(s). WLAN interfaces may include one or more physical communication interfaces 1118 (including wireless antenna(s)) and one or more logical interfaces 1120 to the network, each capable of wireless or wired data transmissions. The 3GPP-capable modem may include one or more antennas, e.g., 4G and 5G antennas, to communicate with wireless base stations including small/femto cells, other client/user devices 1100$n$, and/or other fog network components, e.g., DU or any other edge radio access node. The aforementioned RF antenna(s) are configured to detect and transceive signals from radio access technologies ("RATs," e.g., WLAN, cellular) in the service area or venue. The antenna(s) may include multiple spatially diverse individual elements in, e.g., a MIMO- or MISO-type configuration, such that the spatial diversity of transceived signals can be utilized.

The modem controller chipset 1114 controls and manages wireless data communication, and may include a separate processing apparatus or vice versa (i.e., another processor apparatus that includes the controller). The modem controller chipset is configured to communicate with a wireless network via, without limitation, New Radio technology (including 5G NR and hybrid 4G/5G as specified by 3GPP Release 15 or beyond), Long Term Evolution/Advanced technology (including LTE, LTE-A, LTE-U, LTE-LAA, 4.5G, hybrid 4G/5G), IEEE Std. 802.11 (any variants thereof), PAN technology such as, e.g., Bluetooth (IEEE Std. 802.15.1) or IEEE Std. 802.15.4, ZigBee, Short Messaging Service (SMS), near field communication (NFC) or radio-frequency identification (RFID), WiMAX (IEEE 802.16), WMANs, 3G cellular (e.g., WCDMA, 3GPP, 3GPP2, and GSM and improvements thereon, and ISM band networks). Additional unlicensed, licensed, or quasi-licensed air interfaces may also be used via the shown network architecture, including, e.g., Wi-Fi, CBRS (Citizens Broadband Radio Service)-based LTE, and non-CBRS-band LTE.

Returning to the 4G/5G modem 1118, transmitted data may include, as discussed above, user routine data, routine rules, routine triggers, control plane data, time-shifted control plane data, ledger-based control plane data, records for a distributed ledger data structure, metadata about the client device 1100 or one or more other client/user devices 1100$n$, decentralized ledgers, etc. as discussed above. In other embodiments, the client device may communicate with other network apparatus or components thereof, e.g., small/femto cells, base stations, external radio access node, memory apparatus storing data related to decentralized ledgers, to transmit or retrieve necessary data, or cause the network components to store such data in their respective memory devices.

Figure 12:
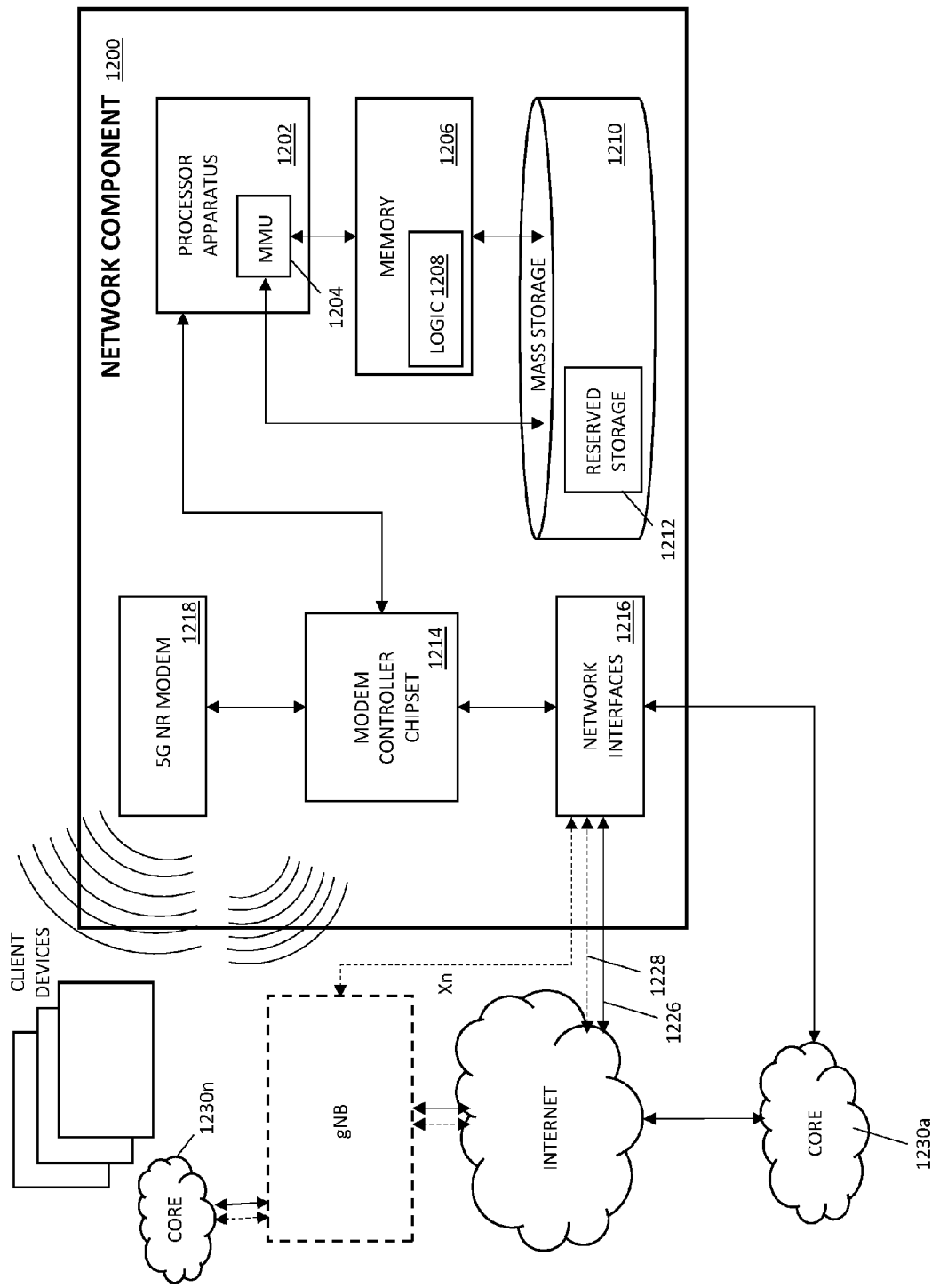
FIG. 12 is a logical block diagram of one exemplary network component, in accordance with various aspects of the present disclosure.

FIG. 12 illustrates a configuration of an exemplary network component 1200 according to the present disclosure. In various embodiments, the network component may be a distribution unit (DU) entity, a central unit (CU) entity, a Node B or similar base station (gNB, eNB, NB, etc.), an external radio access node, a small or femto cell, or base station close to the "edge" of the network, each in physical proximity to client devices in the "fog."

In one exemplary embodiment, the network component 1200 includes, inter alia, at least one processor apparatus or subsystem 1202, a memory management unit (MMU) 1204, a memory apparatus 1206 (e.g., DRAM) with program(s) or logic disposed 1208 thereon, a mass storage device 1210 (e.g., HDD, SSD, NAND flash) with at least one reserved portion 1212 (e.g., to provide temporary or permanent storage space other devices in the network, separate from system files and the like for the operation of the client device). In one embodiment, the processor 1202 may also include an internal cache memory, and in one variant, is in data communication with a dedicated MMU 1204 by which the processor accesses the logic and instructions residing on memory subsystem or device 1206.

The exemplary network component 1200 may further include a modem controller chipset 1214 (e.g., an independently operable processor apparatus or a standalone modem device). The modem chipset may be in data communication with various network interfaces 1216 communicable with a network (e.g., the Internet, backend servers), another fog network entity (e.g., a centralized unit or controller unit) and/or another gNB (and/or another DU and CU that are logically and functionally grouped). In some embodiments, each of these networks and network entities may be accessible via one another.

Network interfaces 1216 may include one or more physical communication interfaces 1226 and one or more logical interfaces 1228 to the network, each capable of wireless or wired data transmissions. The network component 1200 may further include a 5G RF device 1218 having 5G-capable antenna(s) and/or tuner(s) configured to communicate with client devices with 5G antenna(s), another gNB component (e.g., another DU or CU), wireless base stations including small/femto cells, or other fog network components, e.g., any other edge radio access node.

In some embodiments, each core 1230$a$, 1230$n$ is operated by a network service provider (e.g., MNO or MSO) that provides control and user-management functionalities, and may have multiple gNBs associated therewith. The aforementioned 5G RF antenna(s) are configured to detect and transceive signals from radio access technologies (RATs), particularly with network devices (e.g., client devices) using 3GPP-based cellular connectivity (e.g., 5G or 4G/5G-based communication) in the service area or venue.

Communications may be exchanged between the fog network components to transmit and receive data related to, as discussed above, user routine data, routine rules, routine triggers, control plane data, time-shifted control plane data, ledger-based control plane data, records for a distributed ledger data structure, metadata about the client device 1200, etc. Such data may be stored at the memory device 1206 and/or mass storage 1210. In some variants, distributed data (e.g., partial or whole files) is stored on reserved storage 1212 on a relatively permanent basis (e.g., to be stored longer than a threshold amount of time, e.g., overnight) so as to separate it from operational-critical data such as system files required to operate the network component.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. Furthermore, features from two or more of the methods may be combined. All such variations are considered to be encompassed within the disclosure disclosed and claimed herein.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

The functions described herein may be implemented in hardware, software executed by a processor, firmware, or any combination thereof. If implemented in software executed by a processor, the functions may be stored on or transmitted over as one or more instructions or code on a computer-readable apparatus (e.g., storage medium). Computer-readable media include both non-transitory computer storage media and communication media including any medium that facilitates transfer of a computer program from one place to another. A non-transitory storage medium may be any available medium that can be accessed by a general purpose or special purpose computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

What is claimed is:

1. A computerized method for identifying fog networking opportunities, comprising:
   receiving user routine data associated with a first geographic location;
   identifying a routine rule and a routine trigger based at least on the user routine data;
   distributing data relating to the routine rule and the routine trigger to a first device and a second device, wherein the data relating to the routine rule and the routine trigger is configured for storage in a first memory of the first device and a second memory of the second device;
   wherein, the routine trigger is configured to, based on an occurrence of a condition associated with the first geographic location, cause the first device and the second device to each (i) establish a connection to a network, and (ii) execute the routine rule, and
   wherein execution of the routine rule comprises at least the first device and the second device each reserving bandwidth for a fog networking opportunity.

2. The computerized method of claim 1, wherein the identifying of the routine rule and the routine trigger based at least on the user routine data comprises:
   identifying a trigger having a correlation to a future condition that exceeds a minimum predictive value; and
   assigning the routine trigger to the first device and the second device based at least on the identified trigger; and
   assigning the routine rule to the first device and the second device based at least on the future condition.

3. The computerized method of claim 1, further comprising:
   identifying a trigger having a correlation to a future event that exceeds a minimum predictive value;
   determining the minimum predictive value based at least on a difference in demand for at least one of a time resource or a frequency resource from at least one of the first or the second device.

4. The computerized method of claim 1, wherein the routine trigger comprises a first direction of travel within the first geographic location at a temporal range that enables a prediction of a fog networking opportunity at a second geographic location at a second temporal range.

5. The computerized method of claim 1, further comprising causing, based at least on routine rule, the first device to download content and transfer the downloaded content to the second device;
   wherein the second device is present at a fog networking opportunity characterized by a second geographic location and within a prescribed temporal range, the second geographic location and prescribed temporal range determined by the routine trigger.

6. The computerized method of claim 1, wherein the receiving of the user routine data is performed based on one or more conditional events associated with the first geographic location and identified by a user of the first device.

7. The computerized method of claim 1, wherein the routine rule is configured to cause at least one of the first or second devices to minimize performance of one or more non-essential tasks so as to be able to provide additional processing capacity for a fog networking opportunity.

8. Computer readable apparatus comprising a non-transitory storage medium, the non-transitory storage medium comprising at least one computer program having a plurality of instructions, the plurality of instructions configured to, when executed on a digital processing apparatus, cause a computerized apparatus to:
   based at least on data characterizing a trigger condition, receive at least one of (i) control plane data or (ii) data plane data at a first device from a second device;

cause verification, at the first device, of at least a portion of the at least one of (i) the control plane data or (ii) the data plane data;

based on the verification of the at least portion of the at least one of (i) the control plane data or (ii) the data plane data, cause establishment of a data connection between the first device and the second device; and cause execution of a rule at the first device using at least the connection, wherein the rule is part of a plurality of rules that are hierarchically tiered based on at least a plurality of users present at a geographic location.

9. The computer readable apparatus of claim 8, wherein the control plane data comprises time-shifted control plane data, the time-shifted control plane data comprising a challenge or a response, the challenge or the response received from a computerized network entity via an out-of-band communication.

10. The computer readable apparatus of claim 8, wherein:
the trigger condition is characterized by at least the geographic location; and
one or more of the plurality of users are associated with at least one of the first or second devices.

11. The computer readable apparatus of claim 8, wherein the control plane data comprises a credit or debit to a ledger-based data structure.

12. The computer readable apparatus of claim 8, wherein the connection is based on medium access control (MAC) addresses associated with the first and second devices,
the connection configured to enable a wireless device-to-device (D2D) network comprising a plurality of nodes.

13. The computer readable apparatus of claim 12, wherein the plurality of nodes of the wireless D2D network are arranged in a ring topology.

14. The computer readable apparatus of claim 8, wherein the at least one of (i) the control plane data or (ii) the data plane data comprises:
control plane data representative of layers of a protocol stack that carry signaling traffic used for network routing; and
data plane data representative of one or more layers carry signaling traffic used for one or more individual network hops, the one or more individual network hops comprising a portion of a network path between the first and second devices.

15. A computerized wireless-enabled user device, comprising:
a digital processor apparatus;
one or more wireless network interfaces coupled with the digital processor apparatus and configured to perform data communication in a fog network;
a computer-readable apparatus in data communication with the digital processor apparatus and comprising a non-transitory storage medium having at least one computer program thereon, the at least one computer program comprising a plurality of instructions configured to, when executed by the digital processor apparatus, cause the computerized wireless-enabled user device to:
identify trigger data and a rule data based on user data associated with at least one of: (i) an event, (ii) a geographic location or area, or (iii) one or more users; and
transmit the trigger data and the rule data to at least one other device; and
based at least on detection of a condition that corresponds to the trigger data, cause utilization, on a time-shifted basis, of the rule data at the at least one other device.

16. The computerized wireless-enabled user device of claim 15, wherein the plurality of instructions are further configured to, when executed by the digital processor apparatus, cause the computerized wireless-enabled user device to store, in a data structure, nonce data associated with the at least one other device; and
wherein the nonce data associated with the at least one other device enables data communication in a fog network.

17. The computerized wireless-enabled user device of claim 15, wherein the plurality of instructions are further configured to, when executed by the digital processor apparatus, cause the computerized wireless-enabled user device to:
store, in a data structure, a distributed ledger having at least one of credits and or debits.

18. The computerized wireless-enabled user device of claim 15, wherein the plurality of instructions are further configured to, when executed by the digital processor apparatus, cause the computerized wireless-enabled user device to:
receive the user data proximate a certain geographic location to identify correlations between users that frequent the certain geographic location so as to identify one or more of the users that can be used for a purpose associated with the certain geographic location.

19. The computerized wireless-enabled user device of claim 18, wherein the purpose comprises at least one of: (i) to patch a network coverage gap associated with the certain geographic location, or (ii) to cache content with, or share processing power with, one or more user devices associated with respective ones of the users based at least on at least the user's geographic proximity to the certain geographic location.

20. The computerized wireless-enabled user device of claim 15, wherein the one or more wireless network interfaces are further configured to use medium access control (MAC) addresses within a fog network, and use logical network addresses in a local area network (LAN).

* * * * *